United States Patent
Teijido et al.

(10) Patent No.: US 7,929,214 B2
(45) Date of Patent: Apr. 19, 2011

(54) ILLUMINATION ARRANGEMENT FOR A PROJECTION SYSTEM

(75) Inventors: Juan Manuel Teijido, Kernen (DE); Frederic Ludley, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 404 days.

(21) Appl. No.: 10/534,237

(22) PCT Filed: Nov. 6, 2003

(86) PCT No.: PCT/EP03/12417
§ 371 (c)(1), (2), (4) Date: May 6, 2005

(87) PCT Pub. No.: WO2004/043076
PCT Pub. Date: May 21, 2004

(65) Prior Publication Data
US 2006/0044523 A1   Mar. 2, 2006

(30) Foreign Application Priority Data

Nov. 7, 2002 (EP) .................................. 02024962
Apr. 10, 2003 (EP) .................................. 03008353

(51) Int. Cl.
*G02B 27/14* (2006.01)

(52) U.S. Cl. ............ 359/629; 359/497; 385/31; 349/62; 362/553; 362/555

(58) Field of Classification Search .................. 359/497, 359/629; 349/62; 385/31; 362/553, 555
See application file for complete search history.

(56) References Cited

U.S. PATENT DOCUMENTS

| | | | |
|---|---|---|---|
| 4,765,718 A | 8/1988 | Henkes | |
| 4,912,614 A | 3/1990 | Goldenberg | |
| 5,050,946 A * | 9/1991 | Hathaway et al. | 385/33 |
| 6,220,714 B1 | 4/2001 | Eguchi | |
| 6,318,863 B1 * | 11/2001 | Tiao et al. | 353/31 |
| 6,330,114 B1 | 12/2001 | Park et al. | |
| 6,587,269 B2 * | 7/2003 | Li | 359/497 |
| 2001/0048560 A1 | 12/2001 | Sugano | |
| 2005/0174771 A1 | 8/2005 | Conner | |

FOREIGN PATENT DOCUMENTS

| | | |
|---|---|---|
| DE | 199 57 909 | 6/2001 |
| EP | 0 322 070 | 6/1989 |

(Continued)

OTHER PUBLICATIONS

Patent Abstracts of Japan, Publication No. 2002133932, Publication Date May 10, 2002.

(Continued)

*Primary Examiner* — Joseph Martinez
(74) *Attorney, Agent, or Firm* — Oblon, Spivak, McClelland, Maier & Neustadt, L.L.P.

(57) ABSTRACT

An illumination arrangement (1) for a projection system is proposed comprising a light source device (10) and a light collecting, integrating and redirecting device (20). The light source device (10) comprises at least one solid state light source device (30). The light collecting, integrating and redirecting device (20) comprises at least one light integrating device (50), which is adapted to directly receive and to integrate at least a part of primary illumination light (L1) generated by and emitted from at least one associated of at least one solid state light source device (30).

5 Claims, 33 Drawing Sheets

FOREIGN PATENT DOCUMENTS

| | | |
|---|---|---|
| EP | 1 003 064 | 5/2000 |
| EP | 1 024 669 | 8/2000 |
| JP | 2-1888 | 1/1990 |
| JP | 4-234729 | 8/1992 |
| JP | 6-122343 | 5/1994 |
| JP | 2000-112031 | 4/2000 |
| JP | 2000-221595 | 8/2000 |
| WO | WO 01/43113 | 6/2001 |
| WO | WO 02/03130 | 1/2002 |

OTHER PUBLICATIONS

Patent Abstracts of Japan, Publication No. 10123512, Publication Date May 15, 1998.

\* cited by examiner

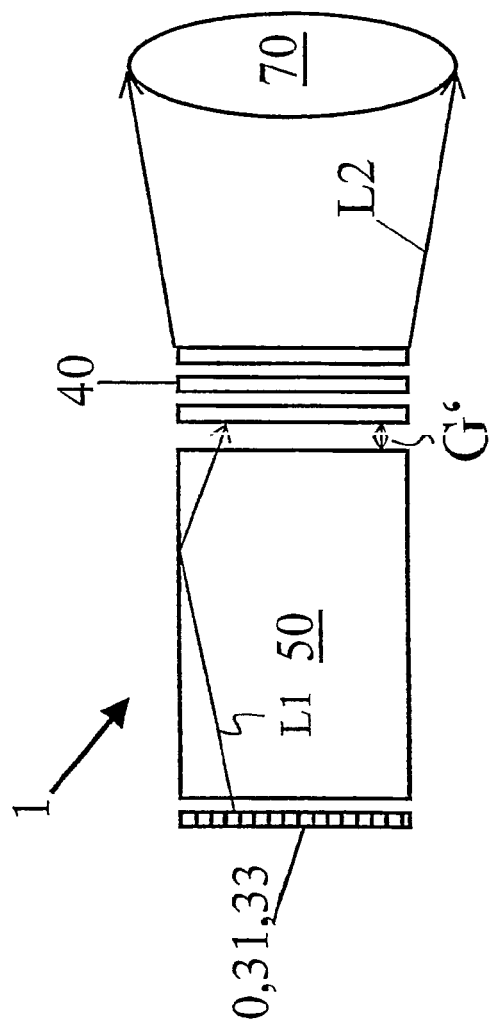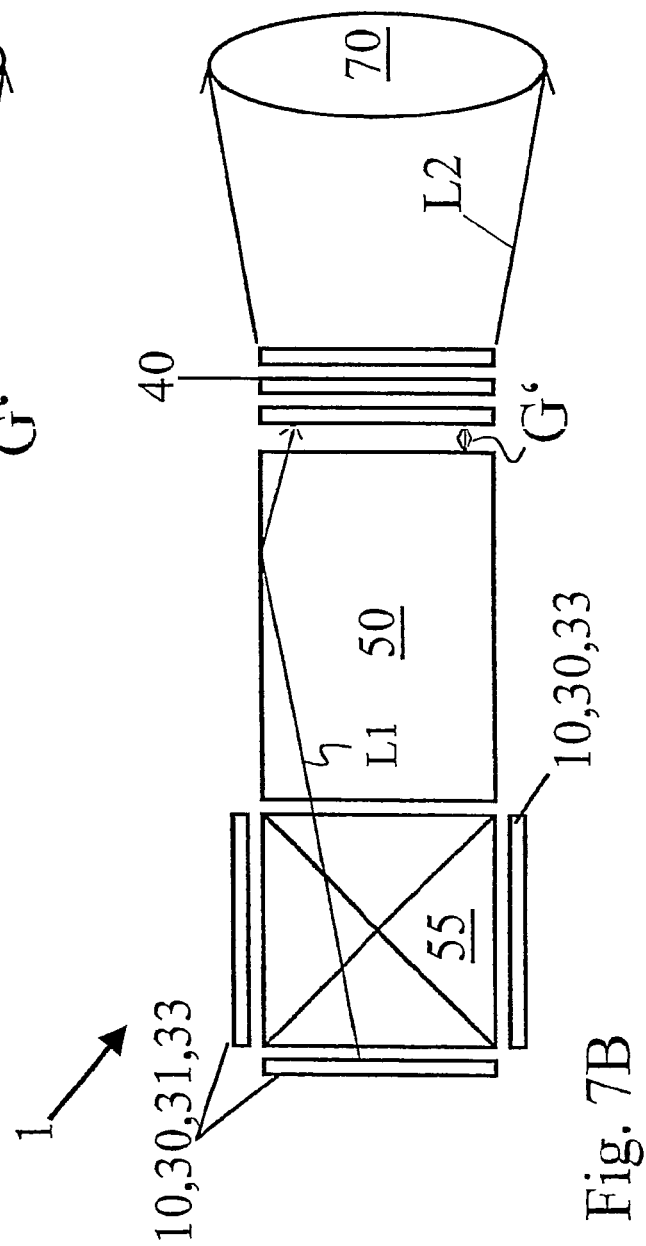

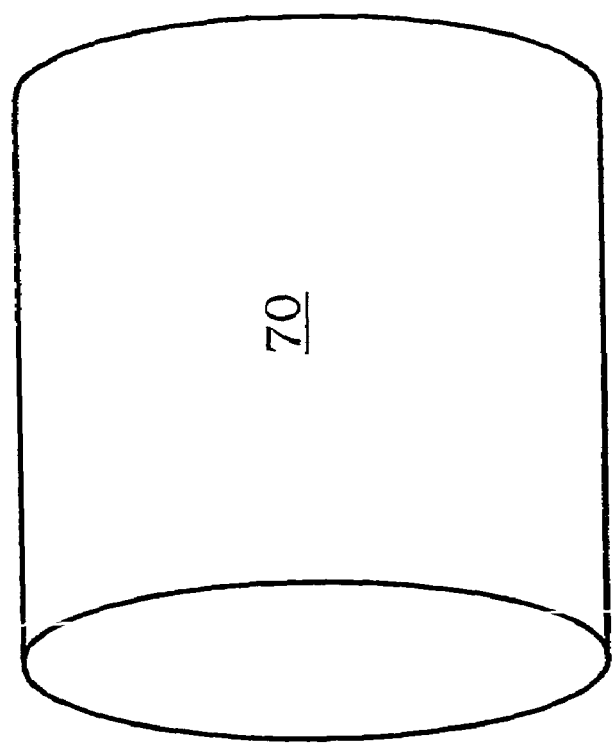
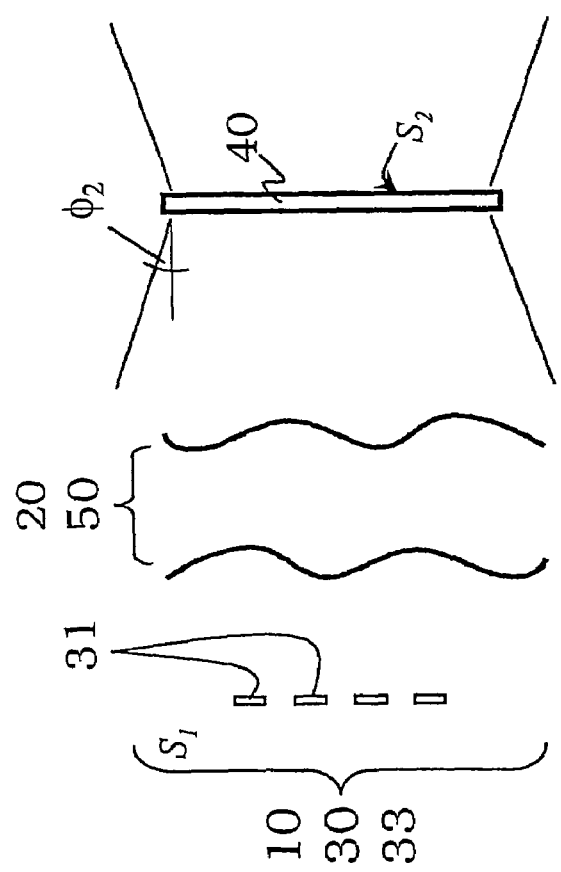
Fig. 10

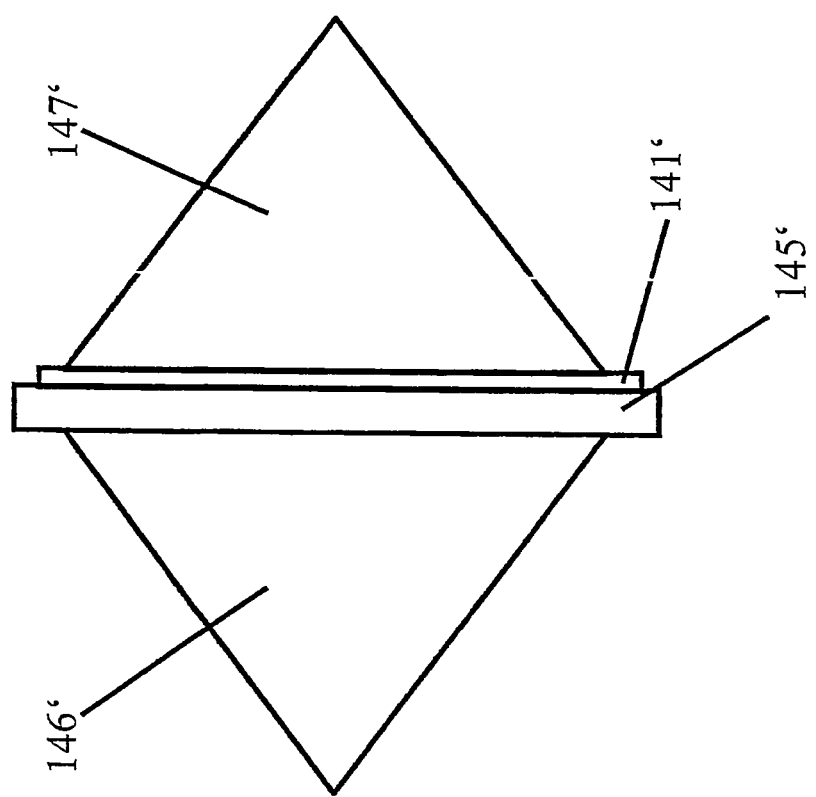

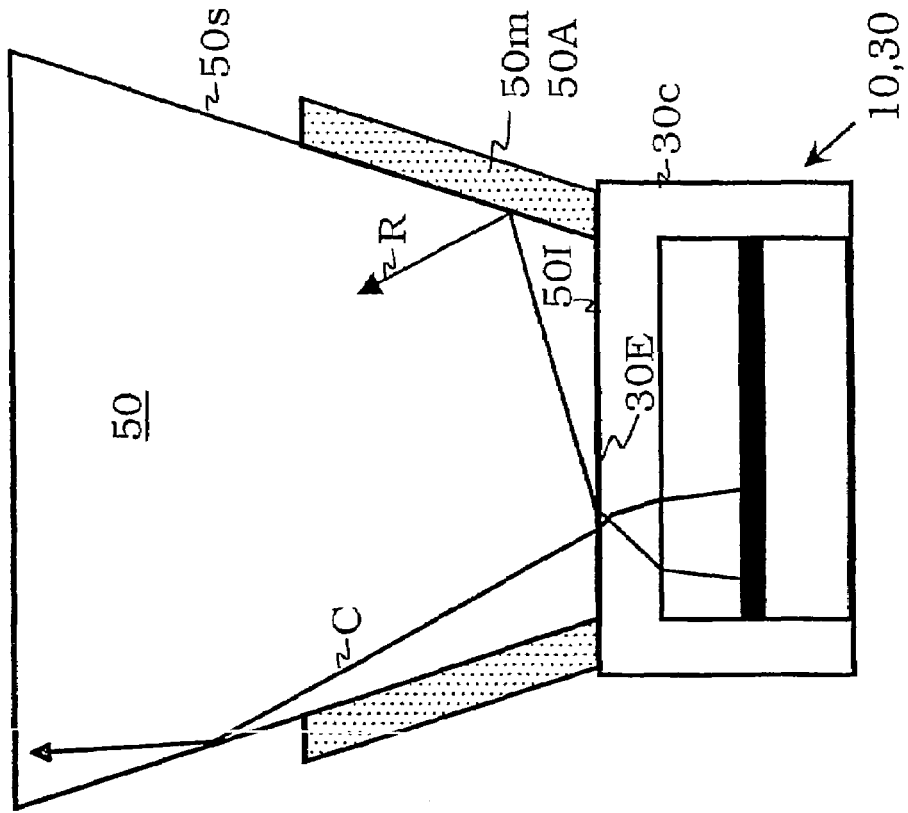
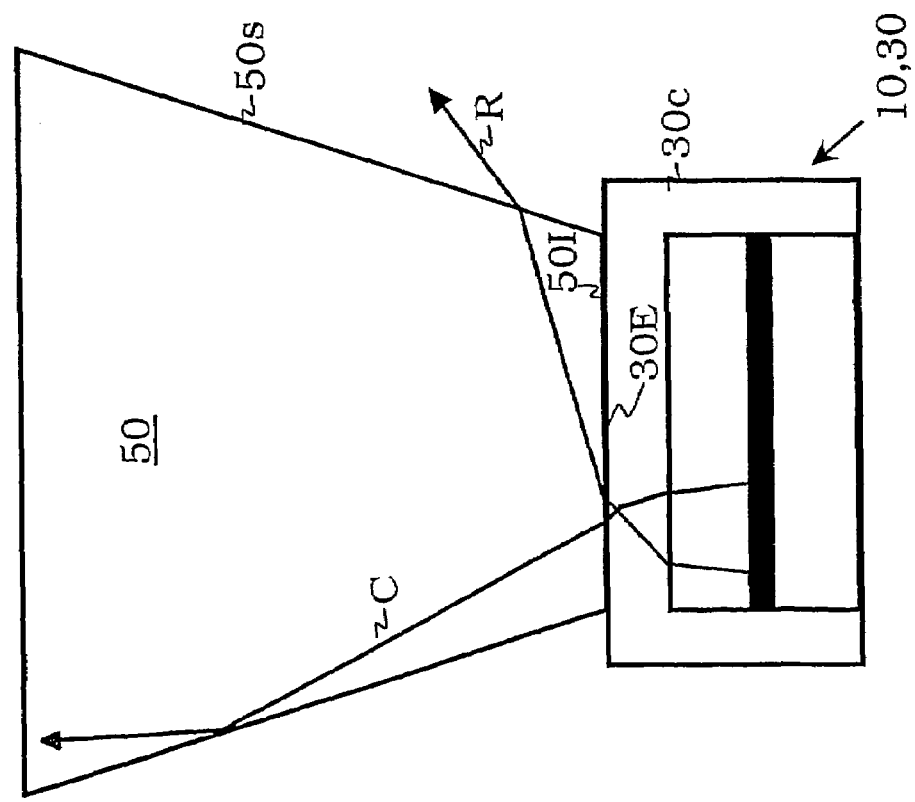
Fig. 29B
Fig. 29A

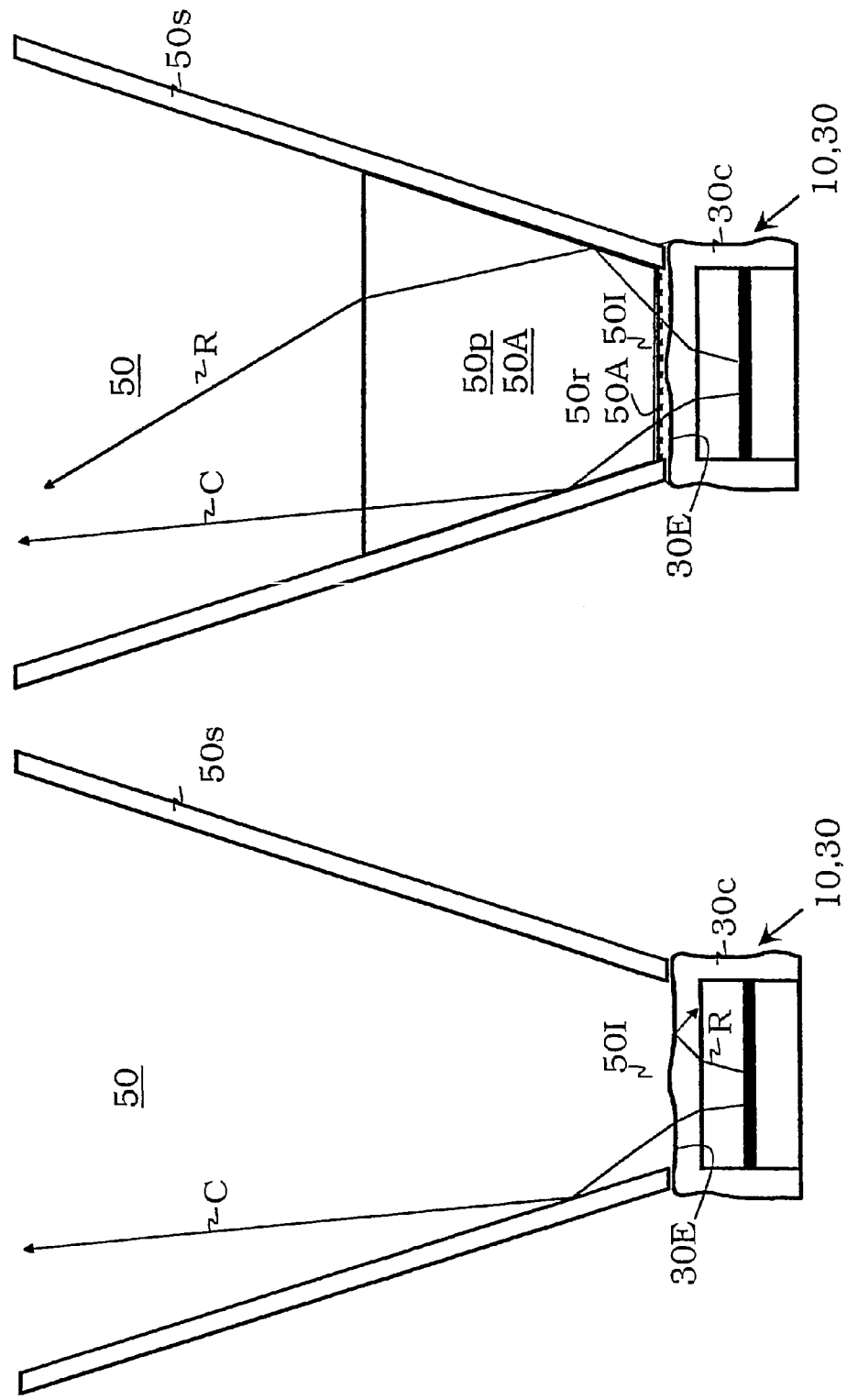

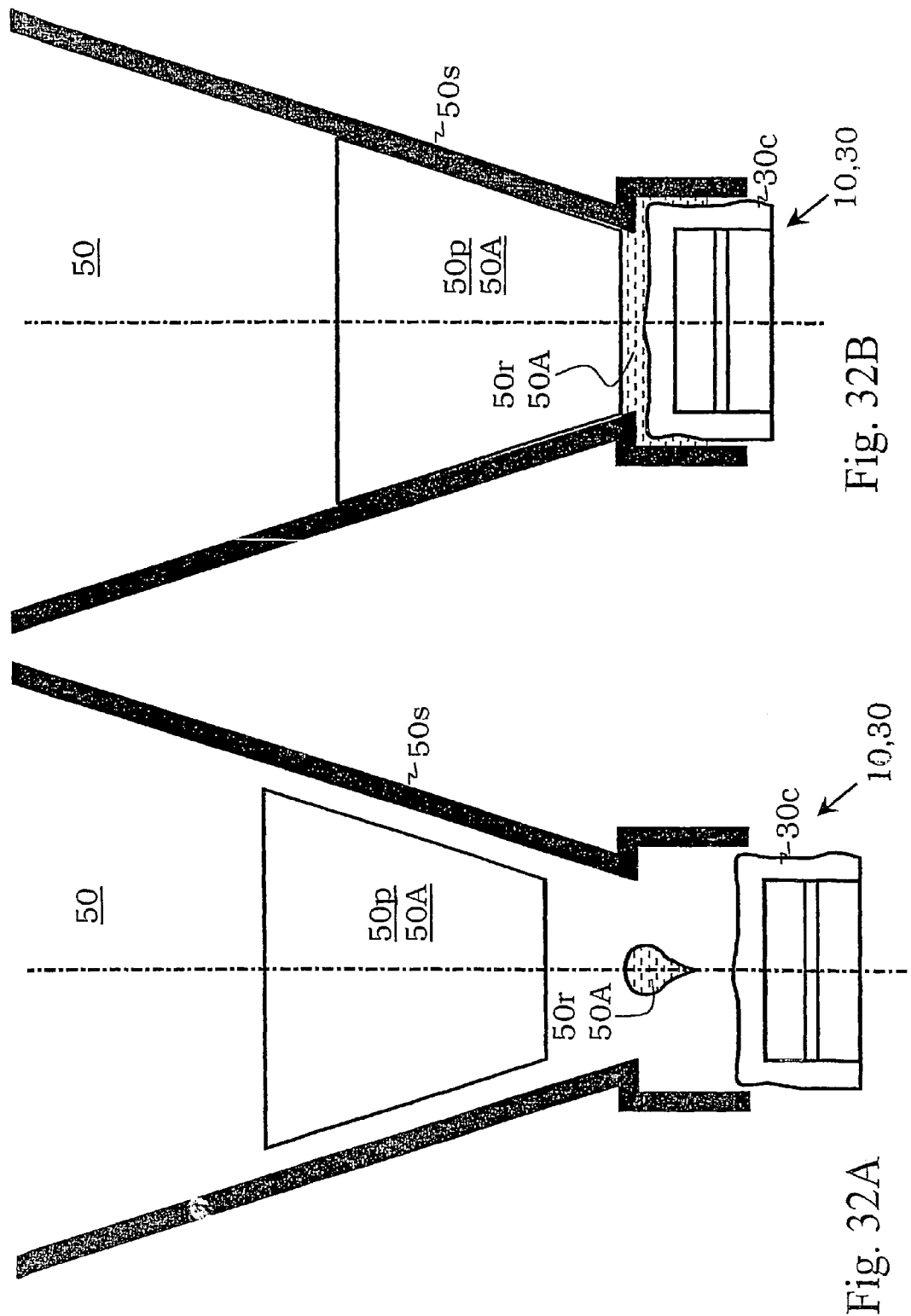

ILLUMINATION ARRANGEMENT FOR A PROJECTION SYSTEM

The present invention relates to an illumination arrangement, in particular for a projection system, or the like, and more particular to an illumination arrangement for a projection system which employs solid state light sources.

Nowadays, in many electronic appliances display devices are necessary for displaying information to a user or an audience. Because of the large variety of different types of electronic appliances having such a display device it became necessary to develop display devices for which only a limited space and/or a limited power consumption are available. Therefore, the idea of involving an array of light emitting diodes (LED) came up, but it was realized at the same time that known and state of the art light emitting diodes have only a very limited light output capability.

It turns out that in recent years, a lot of efforts have been done to provide illumination arrangements allowing an uniform illumination of a surface (e.g. a μ-display) showing a high compactness.

An example of such an illumination arrangement will be explained in detail while making reference to FIG. 21. An illumination arrangement 1' comprises a polychromatic light source array 2', a pyramidal light pipe 3', and a target surface 4' to be illuminated. The light source array 2' comprises a first to fifth light source $2'_1$ to $2'_5$ which preferably may emit light of different colors, respectively. The light pipe 3' fulfills the following functions: Collection and collimation of the light being emitted from the polychromatic light source array 2' and homogenization of the illumination of the target surface 4'. Thus, a polychromatic, uniform and collimated illumination of the target surface 4' can be achieved.

The advantage of the pyramidal light pipe 3' is that the dimensions of an overall light emitting surface of said light source array 2' (which is indicated by the parameter S1, the area of said surface) is sufficient for illuminating the relatively large target surface 4' (which dimensions are indicated by the parameter S2, the area of said surface 4'). However, there is the problem that the size of an input surface 5' of the light pipe 3' limits S1 and therefore limits the maximal number of light sources of $2'_1$ to $2'_5$. As a consequence, the brightness of the light source array 2' and thus the brightness of the light illuminating the target surface 4 is limited.

It is an object of the present invention to provide illumination arrangements, in particular for a projection system, which are capable of using solid state light source devices having only low light output capabilities and/or which—at the same time—enable an easy and reliable optical coupling of the primary illumination light from the solid state light source device to projection optics.

The object is achieved by illumination arrangements according to the features of independent claims. Preferred embodiments of the inventive illumination arrangements are within the scope of the respective dependent sub-claims.

In the following a first solution of the object of the present invention is described:

The illumination arrangement according to the first solution of the object of the present invention is adapted for a projection system, or the like, and comprises a light source device and a light collecting, integrating and redirecting device. The light source device is adapted for generating and for emitting primary illumination light. The light collecting, integrating and redirecting device is adapted for receiving at least a part of said primary illumination light from said light source device in a direct manner. The light collecting, integrating and redirecting device is further adapted to redirect said received primary illumination light so as to obtain directed primary illumination light. Additionally, said light collecting, integrating and redirecting device is adapted for outputting said redirected primary illumination light or a derivative thereof as secondary illumination light. According to the present invention, said light source device is or at least comprises at least one solid state light source device. Said light collecting, integrating and redirecting device comprises at least one light valve device which is adapted for receiving said redirected primary illumination light and for outputting said secondary illumination light in a controllable manner. Further, said light collecting, integrating and redirecting device comprises at least one light integrating device being adapted for directly receiving and for integrating at least a part of said primary illumination light generated by and emitted from at least one associated of said at least one solid state light source devices and for outputting said redirected primary illumination light or a derivative thereof.

It is therefore a basic idea of the present invention to use at least one solid state light source device as said light source device. It is a further basic idea of the present invention to have at least one light integrating device which is adapted for directly receiving and for integrating at least a part of said primary illumination light.

There are several possibilities of realizations for said solid state light source devices. First of all, it is preferred to have the solid state light source device comprised of a single or of a plurality of solid state light sources.

If a plurality of solid state light sources is involved said plurality may be built-up by or may comprise an array of solid state light sources.

It is of particular advantage to involve different lands of solid state light sources, in particular if each of which is adapted for generating and for emitting radiation or light of distinct spectral ranges or colours. In this case, they may be in particular organized in distinct groups, wherein in particular each group is then capable of producing radiation or light of a given spectral range or colour.

According to a further advantageous embodiment of the inventive illumination arrangement each of said solid state light sources is a single light emitting diode (LED) or a multiplicity of light emitting diodes. Also edge-emitting LEDs (EELED) or pluralities thereof can be used.

Alternatively or additionally, each of said solid state light sources is a single vertical cavity surface emitting laser device (VCSEL) and/or a laser diode (LD) or a multiplicity of vertical cavity surface emitting laser devices and/or laser diodes (LD).

Alternatively or additionally, each of said solid state light sources is a single resonant cavity light emitting diode (RCLED) or a plurality of resonant cavity light-emitting diodes.

To allow most of the primary illumination light generated and emitted by the light source device to be used and to be optically coupled to projection optics and to avoid primary illumination light to escape from the location of its generation without being collected it is also proposed that said light integrating device and said at least one associated solid state light source device are disposed in closed spatial proximity or relationship to each other.

It is in particular suggested that said light integrating device and said at least one associated solid state light source device are disposed in direct mechanical contact to each other.

In contrast, the collecting property of the light integrating device can be increased if according to a further preferred embodiment said light integrating device and said at least one associated solid state light source device are adapted to have a gap structure between them, in particular an air gap, an evacuated gap, the gap width of which being small in particular compared to the cross-sections of the light integrating device and/or said at least one associated solid state light-source device.

According to this measure and in accordance to the TIR or total internal reflection condition even more light generated and emitted by the associated solid state light source device can be collected and integrated by said light integrating device, if no air gap is present.

To further increase the light transmission from the associated solid state light source devices to the associated light integrating devices it is proposed in accordance to a further preferred embodiment of the present invention that said light integrating device has a light incidence aperture, that said associated solid state light source device has a light emitting aperture, and that said light emitting aperture is less than or equal to said light incidence aperture with respect to their diameter or cross-section area. According to this particular measure the cross-section or the area of the light incidence aperture of the light integrating device gets the best illumination with respect to the primary illumination light generated by and emitting from the associated solid state light source device.

There are different possibilities of building-up said light integrating device. First of all said light integrating device may be a light pipe, an integrator rod, and/or the like.

Said light integrating device may be a solid rod, made in particular of plastic, glass, or another optical transparent material.

Alternatively, said light integrating device may be built-up as a hollow tube device or tube element having reflecting or mirrored inner walls or side faces.

According to the above-mentioned measures, said light integrating device acts as a light guide for the received primary illumination light.

Advantageously, said light integrating device has a square, rectangular, hexagonal or—in particular equilateral—triangular cross-section to obtain a uniform distribution. Oval or circular cross-sections are also possible if there are uniformity restrictions possible.

Additionally or alternatively, said light integrating device may be built-up as a light mixing device, in particular as a beam splitter device, a colour cube device, and/or the like.

In this case said light integrating device may have a plurality of light incidence apertures and at least one light output aperture.

According to this measure it is possible to use said light integrating device as an input stage for the primary illumination light of different and separated solid state light source devices, the primary illumination light of which entering different light incidence apertures and the mixing light leaving the light integration device after being mixed within said light integrating device and exiting the light integrating device from said light output aperture.

Of course, different light integrating devices can be combined with each other so as to combine and integrate and redirect primary illumination light stemming from different and spatially separated different solid state light source devices to yield a secondary illumination light having best illumination and projection properties.

According to a further aspect of the present invention a light coupling and/or guiding improving arrangement is provided which is adapted and/or arranged so as to improve the coupling and/or the process of guiding of said primary illumination light from said light source device to and/or within said light collecting, integrating and re-directing device and in particular to and/or within said light integrating device.

In the following a second solution of the object of the present invention is described:

According to the second solution of the object of the present invention, an illumination arrangement according to a first solution of the object comprises at least two light sources for generating first light beams, respectively, a light mixing device for inputting said first light beams and combining them to a single second light beam, and a pyramidal light pipe which inputs the second light beam and outputs a third light beam. The third light beam is the desired output light beam which illuminates the target surface (which may for example be a "μ-display").

Preferably, three light sources are used, each of them generating a first light beam of one of the colors green, red, and blue, respectively. However, also other colors may be used. Further, more than three light sources may be used.

In a preferred embodiment, the light mixing device is a color cube which shows at least two input surfaces for inputting one of the first light beams, respectively, and one output surface for outputting the second light beam. Alternatively, the light mixing device is constituted by a dichroic filter or a combination of dichroic filters. Each of the dichroic filters shows at least one input surface for inputting one of the first light beams, respectively, and one output surface. The combination of dichroic filters may, for example, comprise a first and a second dichroic filter, wherein the first dichroic filter shows two input surfaces for inputting two of the first light beams, and one output surface for outputting a first combined light beam, wherein the second dichroic filter comprises one input surface for inputting one of the first light beams, one input surface for inputting the first combined light beam, and one output surface for outputting a second combined light beam which is the single second light beam mentioned above.

The terms "combining/combine" in the expressions "combining the first light beams to a single second light beam" and "a first combined light beam" and "a second combined light beam" may mean superposition of light beams of a common cross-section, or a light beam which alternately consists of different single light beams over the time (i.e. no superposition, known as "sequential coloring").

Advantageously, the length and the width of output surfaces of the light sources are equal to or less than that of respective input surfaces of the color cube/the respective input surface of the dichroic filters. Thus, an optimum of light power is inputted into an input surface of the light pipe. However, the length and width of output surfaces may also be smaller than the input surfaces of the color cube/dichroic filters. Preferably, the length and the width of an output surface of the color cube/dichroic filter which outputs the second light beam is equal to or less than the length and the width of an input surface of the pyramidal light pipe which inputs the second light beam.

Between the light sources and the light mixing device and/or between the light mixing device and the pyramidal light pipe air gaps may be provided, respectively, in order to improve light collection.

Between each light source and the corresponding input surfaces of the color cube/dichroic filters additional pyramidal light pipes may be located. This enables a great flexibility as far as the dimensions of the light mixing device are concerned. Preferably, in this embodiment, the lengths and the widths of the output surfaces of the light sources are equal to or less than the lengths and the widths of input surfaces of the additional pyramidal light pipes, and the lengths and the widths of output surfaces of the additional pyramidal light pipes are equal to or less than the respective input surfaces of the color cube/dichroic filters. The output surfaces of the light sources may, however, also be smaller than the input surfaces of the color cube/dichroic filters. To increase light collection, the additional pyramidal light pipes and the light sources are in direct mechanical contact with each other. To further improve light collection, between the additional pyramidal light pipes and the light mixing device air gaps are provided.

As has become apparent, an important aspect of the inventive illumination arrangement described above is that the use of a light mixing device makes it possible to increase the output surfaces of the light sources without increasing the input surface of the pyramidal light pipe. As a consequence, the brightness of a target service to be illuminated by the illumination arrangement can be increased while at the same time the dimensions of the illumination arrangement are increased only very slightly.

In the following a third solution of the object of the present invention is described:

According to said third solution of the object of the present invention an illumination arrangement is provided comprising at least two light sources for generating first light beams, respectively, a light mixing device for inputting the first light beams and combining them to a single output light beam, and at least two pyramidal light pipes which are located between a light source and the light mixing device, respectively.

Preferably, input surfaces of the pyramidal light pipes and the corresponding light sources are in direct mechanical contact with each other. Further, between the pyramidal light pipes and the mixing device air gaps may be provided.

This embodiment also shows above mentioned advantages of a high compactness and an increased brightness of an output light beam. An additional advantage of this embodiment is that the mixing device shows larger dimensions compared to that of the first embodiment. As a consequence, the light mixing device of this embodiment is easier to manufacture.

The colour cube and/or the dichroic filters preferably comprise at least two glass prisms, respectively.

Advantageously, but not necessarily, between two of the glass prisms of a color cube/dichroic filter a glass plate is provided, respectively which is coated by a transmissive/reflective film, wherein the surface dimensions of the glass plate are bigger than the surface dimensions of surfaces of the prisms sandwiching the glass plate.

In the following a fourth solution of the object of the present invention will be described:

According to said fourth solution of the object of the invention an illumination arrangement is provided, in particular for a projection system or the like. Said illumination arrangement comprises a light source device which is adapted for generating and for emitting primary illumination light. Further a light collecting, integrating and re-directing device is provided being adapted for receiving at least a part of said primary illumination light from said light source device and for re-directing said received primary illumination light so as to obtain re-directed primary illumination light and for outputting said re-directed primary illumination light or a derivative thereof as secondary illumination light. Said light collecting, integrating and re-directing device comprises at least one light integrating device being adapted for directly receiving and for integrating at least a part of said primary illumination light generated by and emitted from at least one associated light source device and for outputting said re-directed primary illumination light or a derivative thereof. According to that particular solution a light coupling and/or guiding improving arrangement is provided which is adapted and/or arranged so as to improve coupling and/or guiding of said primary illumination light from said light source device to and/or within said light collecting, integrating and re-directing device and in particular to and/or within said light integrating device.

It is therefore a basic idea of said fourth solution to provide a light coupling and/or guiding improving arrangement. This particular light coupling and/or guiding improving arrangement is adapted to improve the light coupling from the light source device or a mixing device to said light collecting, integrating and re-directing device in particular to said light integrating device. Alternatively or additionally, said light coupling and/or guiding improving arrangement is adapted to improve the efficiency of the guiding process within said light collecting, integrating and re-directing device in particular within said light integrating device, for instance by reducing the escape of light from the light collecting, integrating and re-directing device and in particular from said light integrating device.

According to a preferred embodiment of this fourth solution said light integrating device is or comprises a plain light pipe—in particular a solid integration rod—having a light incidence aperture and a side wall. Said side wall of said light integrating device is provided with reflecting means as said light coupling and/or guiding improving arrangement or as a part thereof at its outer periphery at least in a neighborhood of said light incidence aperture. Further, said light reflecting means is adapted and/or arranged to reflect light escaping from said light integrating device with a side wall thereof back into said light integrating device.

According to a further aspect of the present invention in the case wherein said light integrating device is or comprises a plain light pipe, said light incidence aperture of said light integrating device may be positioned in a neighborhood of a light exit aperture of said light source device and/or of said light mixing devices. In this case, between said light incidence aperture of said light integration device in said light exit aperture of said light source device and/or said light mixing devices refraction index matching means may be provided, in particular filling a gap or a gap structure between said light incidence aperture of said light integration device in said light exit aperture of said light source device and/or of said light mixing devices.

Additionally or alternatively said reflection index matching means may be a liquid, gel, and/or a glue.

Additionally or alternatively said refraction index matching means may have a refraction index which essentially coincides with the refraction index of the material of the light integration device or with the refraction index of a material of the light source devices periphery. Said refraction index of said refraction index matching means may also interpolate between these values for refraction indices.

According to a further alternative or additional embodiment of the present invention said light integration device may or may comprise a hollow light pipe having a light incidence aperture. In this case said light incidence aperture of said light integrating device may be positioned in a neighborhood of a light exit aperture of said light source device and/or of said light mixing devices. In this case a section or an enter section of the light integration device in the neighborhood of said light incidence aperture and/or being terminated by said light incidence aperture may be—in particular completely—filled with a plain pipe section as said light collecting and/or guiding improving arrangement or as a part thereof, in particular for matching the respective refraction indices.

In the following these and further aspects of the present invention will be more elucidated:

Solid state light sources (SSLS) present a number of advantages for rear- and front-projector engines when compared with traditionally used high pressure lamps. In particular, SSLSs allow colour management at the source level; they allow a better colour saturation, and they have a much longer lifetime. Moreover, SSLSs allow the design of new light engine architectures leading to more compact and potentially cheaper devices.

The improvement of the lumen output, e.g. of light emitting diodes (LEDs), make them a natural tentative candidate to be used in projectors. As the light emitted by a single LED is not sufficient for some projector applications, the idea of collecting the light emitted by an array of LEDs and in redirecting it through the light valve came up. If the LED array covers a surface greater than the panel surface, light pipes or optical fibres commonly are used to collect the light of each individual LED. This approach requires a precise and costly assembly.

Instead, it is proposed to optimise the design of the illumination engine based on today and incoming solid state light source technology based e.g. on optimised light source configurations combined with an integration rod.

The problem of common projectors using solid state light sources is the limited brightness or lumen output reaching the screen. The brightness depends on the source throughput, the directivity of emission of the source and the optical efficiency of the projector engine.

As types of solid state light sources light emitting diodes (LED), edge-emitting light-emitting diodes (EELED) resonant cavity light emitting diodes (RCLED), laser diodes (LD), and vertical cavity surface emitting lasers VCSEL are suggested.

The limitations of available LEDs are the limited throughput and the non-directive emission according to the Lambertian emission law.

VCSEL and RCLED have the big advantage to have a very directive emission. The limitations of available VCSEL and RCLED are e.g. that commercially available VCSEL and RCLED and lab samples of visible VCSEL and RCLED are not powerful enough, and are only available for red and blue.

LD's have the big advantage of a very directive emission. The limitation of available LDs is that commercially available LDs are powerful enough in red only.

The invention proposes e.g. projector engine designs which optimise the use of LEDs of today technology as well as the use of VCSELs and RCLEDs as well as LDs. Moreover, some of the proposed designs are extremely compact and will allow the realization of embedded projectors, which is impossible with today technology.

A first proposed approach consists in using LED arrays whose overall surface is smaller or equal to that of the light valve. In this case the light is guided onto the light valve by a single and simple light pipe, whose role also consists in making uniform the light distribution as shown in FIG. 1. The light pipe, also called integrator rod, can either be a solid glass or plastic rod or a hollow mirrored tube e.g. with a rectangular cross section. For a good coupling efficiency, an air gap is required between the LED array and the light pipe, and between the light pipe and the light valve. To avoid that too much light escapes laterally, this air gap should be kept as small as possible. The simplicity of the design is based on the matching of the light pipe and the light valve cross sections. Thus the light valve is uniformly illuminated by light coming out from the light pipe. The cross section of the LED array has to be smaller or equal to the cross section of the light valve.

Beside marginal losses produced by Fresnel reflection at the light pipe extremities, all the light emitted by the LED array is directed onto the light valve. At this point, the light has to go through the light valve and the projection optics before reaching the projection screen. Both the light valve and the projection optics have a limited angle of acceptance or aperture. This means that only the light included within a given cone of acceptance is going to reach the screen, the rest being lost.

The aperture of the projector is determined by the F/number of the projection optics, typically between F/3 (half cone angle of 10°) and F/2 (half cone angle of 15°). This means that at the light valve plane, all the light which is not within the cone of acceptance is lost.

LEDs, without complementary optics, emit light vs. a Lambertian distribution. When the light reaches the projection optics, only the proportion of light within the cone of acceptance is going to reach the screen. As shown in FIG. 3, only small part of the emitted energy (3.0% for F/3 and 6.7% for F/2) is included within the acceptance cone.

The optics between the LED array and the light valve can redirect the rays within the cone of acceptance, increasing the efficiency of the device. This can be done either, by using collimation micro-lenses in front of the LED array as shown in FIG. 4A, or by using a pyramidal integration rod according to FIG. 4B. In both cases however, the active emitting surface is smaller than the light valve surface. In other words, the efficiency of the illumination engine can be improved by using collimation optics, but at the cost of the light throughput of the LED array because of a diminution of the emitting surface.

Overall the limited (but improving) throughput of the Lambertian emitting LED arrays limit their use to projectors having low lumen output requirements, e.g. in rear-projection TV.

Vertical cavity surface emitting lasers CVCSEL) have the interesting property that they emit light within a cone of typically beam divergence of ±8° which is smaller than the cone of acceptance of the projection optics. Therefore, beside the losses of each individual optical element, all the energy emitted by a VCSEL array would reach the screen. As shown in FIG. 2, the VCSEL array can have the exact cross-section of the light valve. The intermediate optics, i.e. the integration rod, is only used as light distribution uniformiser and has no collimation functionality.

Laser diodes have astigmatic emission, i.e. they do not need to be collimated in one axis (like VCSELs), but require collimation in the other axis. Asymmetric light pipes are therefore used.

FIG. 5 illustrates the architecture of a three-colour-path transmissive projector based on solid state light sources either LED array of VCSEL array and/or RCLED array. The imaging optics light valve and projection lens can be the same as those of a high-pressure lamp projector. However, the illumination engine is simplified and more compact, no fly-eye lens, no relay lenses are involved.

Solid state light sources can also be used in sequential colour projectors. The advantage over HP lamp sequential projectors is that colour management can be done directly at the source level, i.e. no colour filter for colour separation is needed. The colour selection is made electronically by switching on and off the different light sources.

Very compact architectures can be achieved when using back-lighting illumination light pipes. The illumination light pipes have a similar design to those used for the back-lighting of T-LCD displays, typically used in laptops an cell phones. The light is guided inside the light pipe by total internal reflection and is selectively out-coupled from the light pipe by scattering zones placed along the light pipe surface. These compact projectors can be embedded into portable devices such as UMTS cell phones, camcorders, palmtops, or the like.

What distinguish configurations of FIGS. 5, 7 and 8 is the place available for the sources, i.e. for the emission surface, and therefore the resulting lumen throughput of the projector. The extremely reduced space available for the sources in FIG. 8 configurations implies the use of a highly efficient light sources, like VCSEL arrays and/or RCLED arrays.

Configurations based on reflective light valves can also be built around solid state light sources. Nevertheless, the integration rod cannot be placed in close contact with the light valve, as the light should escape through the projection lens. In other words, some kind of beam splitter is needed in front of the light valve. The uniform distribution of light coming out of the integration rod has to be projected by some relay optics on the light valve. Basically all the standard reflective projector configurations based on integration rods can be adapted; in order to use solid state light sources.

These reflective configurations are not as compact as the proposals based on transmission light valves. On the other hand there is space to place some kind of polarization recycler between the integration rod and the light valve. The same remark applies to traditional transmission configurations which make use of integration rod, relay optics and polarization recycler. They can also be adapted in order to make use of solid state light sources.

When compared with traditional high pressure lamp projectors the invention offers the following advantages:
  Better colour saturation and larger colour gamut
  Colour management at the source level
    no need of colour filters
    electronic sequential colour management
    possibility of dynamic contrast adjustment.
  Much increased lifetime of the source
  No infrared emission on the optical path (cold light source)
    possibility to use low cost plastic optics
  Possibility to improve the red channel of current three-colour-path projectors.

When compared with other proposed LED projectors the invention offers the following advantages:
  Simpler design based on integration rod in close contact with the source panel and the light valve (no fly-eye lens, no relay optics)
  Optimised LED-to-light-valve coupling efficiency
  Use of directive emitting VCSELs, RCLEDs, or LDs for much increased optical efficiency
  Ultra-compact configurations based on back-lighting light pipes.

In the following, some further general and theoretical aspects of the inventive concept and its realisations are given taking reference to FIGS. 10 to 12:

One Aspect of the present invention and its embodiments is to solve the problem of finding a configuration which maximizes the illumination of a surface using an array of LEDs. Moreover, the illumination of the surface needs to be uniform and the direction of the rays kept within a limited aperture. The aperture or the angle of acceptance is determined by the numerical aperture of the imaging optics. The difficulty of the task comes from the fact that the angle of acceptance is generally small when compared to the large angular emission of the LEDs, having e.g. typically a Lambertian distribution.

An illuminated surface may be, for example, the probe plane of a microscope, or the light valve plane of a projector. The imaging optics are in these cases the microscope objective or the projector objective.

A goal consists of illuminating a plane uniformly with maximum light power and within a limited aperture of the optics. In other words, 1. maximization of the collection efficiency or the capture of light emitted by the LEDs,
2. maximization of the collimation efficiency or the directing of light with the aperture of the given optics, and
3. maximization of the light engine efficiency or the minimization of the optical losses of the components have to be achieved and are achieved by the present invention.

The problem which is illustrated in FIG. 10, consists of finding a configuration which maximizes the illumination of a surface using an solid state light sources or array 33 of LEDs 31. Moreover the illumination has to be uniform and the direction of the rays kept within a limited aperture.

The illuminated surface $S_2$ may be, for example, the probe plane of a microscope, or the plane of a light valve 40 of a projector. The maximal aperture of the illumination rays is then defined by the numerical aperture of the microscope objective or the F-number of the projector objective 70.

The difficulty of the task stems inter alia from the non-directive radiation pattern emitted by the LEDs 31, which is e.g. typically a Lambertian distribution. This light needs to be redirected onto the limited surface to illuminate and within the limited aperture of the optics.

Theoretical Background

In the following, again reference is taken to FIGS. 10 to 12.

All illumination designs have to take into account the étendue theorem which states that the étendue or optical extent along an optical system cannot be reduced. For a given surface S the étendue E is defined by the surface S multiplied by the solid angle $\Omega$ sustaining the light rays, i.e.

$$E = S \cdot \Omega, \tag{1}$$

according to FIG. 11 for Definition of the étendue E.

In the general system illustrated in FIG. 10, the maximal useful étendue $E_2$ is defined by the surface $S_2$ to illuminate and the solid angle $\Omega_2$. For instance, if for the étendue $E_1$ of the source the relation $E_1 > E_2$ holds, then part of the light is lost.

The solid angle $\Omega_2$ is function of the aperture of the optics and is given by the equation $$\Omega_2 = 2\pi \cdot (1 - \cos \phi_2) = 4\pi \cdot \sin^2(\chi_2/2), \tag{2}$$

where $\phi_2$ is the half angle of the cone of aperture.

The étendue $E_1$ of the LED array is defined as $$E_1 = \Omega_1 \cdot \sum_{i=1}^{N} S_{1i} = 2\pi \cdot S_1, \tag{3}$$

where $S_{1i}$ is the emission surface of each individual LED, N is the number of LEDs in the array, and $2\pi$ is the solid angle of the hemisphere corresponding to the Lambertian emission.

100% Collimation Efficiency System

The étendue theorem states that the étendue along an optical system cannot be reduced. Therefore, in order to achieve an optical system with a 100% collimation efficiency, the emission surface $S_1$ of the LED array cannot exceed $S_{1max}$ as is shown by the following relations $$E_1 \leq E_2, \tag{4}$$

$$2\pi \cdot S_1 \leq 4\pi \cdot \sin^2\left(\frac{\varphi_2}{2}\right) \cdot S_2, \text{ and}$$

$$S_1 \leq S_{1\,max} = 2 \cdot \sin^2\left(\frac{\varphi_2}{2}\right) \cdot S_2.$$

System with Limited Collimation Efficiency

If for the surface of emission the relation $S_1 \geq S_{1max}$ holds, part of the emitted light will not reach the surface $S_2$ within the aperture $\phi_2$, and will therefore be lost.

The problem is analysed by looking at what is the emitted cone or half-angle $\phi_1$ at the surface $S_1$ which is within the aperture of the optics or half-angle $\phi_2$ at the surface $S_1$.

From the étendue theorem it follows that $$S_1 \cdot 4\pi \cdot \sin^2\left(\frac{\varphi_1}{2}\right) = S_2 \cdot 4\pi \cdot \sin^2\left(\frac{\varphi_2}{2}\right).$$

is fulfilled. Therefore, $$\varphi_1 = 2 \cdot \sin^{-1}\left[\sqrt{\frac{S_2}{S_1}} \cdot \sin\left(\frac{\varphi_2}{2}\right)\right] \quad (5)$$

is also fulfilled.

The coupling efficiency $\eta_c$ is defined as the ratio of the emitted energy $W_1$ within the cone defined by $\phi_1$, and the total energy $W$ emitted by the source or surface $S_1$, i.e.:

$$\eta_c = \frac{W_1}{W}. \quad (6)$$

In the case of a Lambertian light source with an emission angle $\gamma = \pi/2$, the coupling efficiency becomes $$\eta_c = \frac{\int_{-\varphi_1}^{+\varphi_1}\int_{-\varphi_1}^{+\varphi_1}\cos(\alpha)\cos(\beta)\cdot d\alpha \cdot d\beta}{\int_{-\pi/2}^{+\pi/2}\int_{-\pi/2}^{+\pi/2}\cos(\alpha)\cos(\beta)\cdot d\alpha \cdot d\beta} = \sin^{-2}\varphi_1. \quad (7)$$

The luminous flux $W_2$ reaching the surface $S_2$, within the aperture $\phi 2$ is proportional to the emission surface $S_1$ of the source and to the collimation efficiency $\eta_c$, $$W_2 \propto \eta_c \cdot S_1. \quad (8)$$

Three cases can be distinguished:
1) $S_1 \leq S_{1max}$ and $\eta_c = 1$, all the light emitted by the source can be used: $W_2 \propto S_1$,
2) $S_2 \leq S_1 > S_{1max}$ and $\eta_c < 1$, part of the light is lost, but as the surface of emission $S_1$ increases, $W_2$ increases, and
3) $S_2 > S_1$, the surface of emission $S_1$ increases, but $W_2$ does not increase.

Proposed Solution and Features

Different solutions based on reflectors and/or refractive lenses have been proposed for the collimation of LEDs. The drawback of these known approaches is that it is difficult to collect 100% of the light in the desired direction. Moreover the optics surrounding the LED is cumbersome, artificially increasing the étendue of the source. In addition, further optics is needed to make the illumination uniform, e.g. fly-eye lenses or an integration rod.

According to the present invention an approach based on—in particular pyramidal shaped—integration rods is proposed. This approach fulfils the three needed functions of
  collecting the light emitted by the LED array,
  collimating within the aperture of the optics, and
  homogenising the illumination.

The working principle of a pyramidal integration rod or PIR is illustrated in FIG. 5. The PIR has an entry surface S', an exit surface S", and length L. The PIR can be an empty tube whose internal faces are mirrors, or a plain transparent material—e.g. mineral glass, plastic or the like—of index n. For a plain PIR, the rays are reflected on the surface by total internal reflection or TIR. As is illustrated for two rays in FIG. 5, the angle with respect to the PIR surfaces normal is smaller at the exit of the pipe than at its entrance. Given the étendue theorem, the collimation is defined as $$\Omega'' = \frac{S'}{S''} \cdot \Omega', \quad (9)$$

where $\Omega'$ is the solid angle of the ray before the PIR, and $\Omega''$ is the solid angle of the ray after the PIR. The relations S">S' and $\Omega''<\Omega'$ are fulfilled.

As for a normal integration rod, the rays are mixed within the rod. Two condition have to be fulfilled in order to get an uniform distribution at the PIR exit surface:
1. The PIR cross-section has either to be square, rectangular, (in particular equilateral) triangular, or hexagonal.
2. The PIR has to be long enough to allow enough reflections against the PIR surface.

The theoretical collimation efficiency $\eta_c$ is achieved for $L \geq L_c$. Above the length $L_c$ the collimation efficiency is constant. $L_c$ is determined experimentally or by ray-tracing simulation, in a case by case basis.

In problem described above, the PIR entry surface S' has to coincide with the LED emission surface $S_1$, and the PIR exit surface S" has to coincide with the surface $S_2$ to illuminate. As the LED array is constituted by a set small emission surfaces $S_{11}$, a micro PIR can be placed in front of each LED. The light is then collected by a bigger PIR or integration rod. The three systems illustrated in FIG. 6 are all equivalent, given the length of the PIR is long enough to complete the collimation and the homogenisation.

Main advantageous features of the present invention are the usage of a single optical element is used for light collection, light collimation, and light homogenisation. By using a single component from the light source (LED array) to the illuminated plane, the proposed approach minimizing the optical loses, lowers the manufacturing costs, and simplifies the device assembly.

These and further aspects will also be elucidated in the following:

The invention proposes inter alpha an illumination scheme based on a colour multiplexer and light pipes. It allows the uniform illumination of a surface (e.g. a m-display) by the combining the light of different colour light sources (e.g. red, green, and blue LEDs). The invention consists in the combination and particular assembly of the different optical components allowing an extremely compact embodiment.

Colour combination can either be achieved by using a suite of dichroic filters or by using a colour cube. The combination of dichroic filters (coated glass plates) allows the combination of different colour beams into a single polychromatic beam. The coatings reflect one single colour (e.g. green or red) and transmit all the others. Note that the suite of dichroic filters can also be applied on prisms.

The colour cube is formed by the assembly of four prisms. The prism surfaces forming the cube diagonals are coated in such a way to reflect one colour (e.g. red or blue) and to transmit all other colours. In this way, three different colour beam can be recombined in a single polychromatic output beam.

It should be noted that these colour combination schemes do not fulfil any function in order to homogenize the illumination produced by the output beam.

A illumination engine has been developed using a pyramidal light pipe. The light pipe fulfils the following functions: collection of the light coming from the light source (or array of light sources), collimation of the light coming from the source(s), and homogenisation of the illumination. It should be noted, that an array of different colour sources can be used. In this way a polychromatic, uniform, and collimated illumination is achieved.

However, the limited surface of the light pipe input surface determines the maximal number of source elements, and therefore limits the brightness of the source A problem consists in finding a configuration which has the same functionality of the illumination set-up presented with light collection, light collimation, homogenisation of illumination, but with a increased surface available for the sources (allowing an increased brightness.

A key parameter (requirement) is the compactness of the embodiment (e.g. for illumination of m-displays).

A basic idea in order to increase the brightness of the colour illumination device is to combine the properties of the colour combination schemes described, in particular with the $2^{nd}$ proposal below, and the light pipe illuminator described, in particular in the $3^{rd}$ proposal below. One goal is to have a bigger surface for coupling the light sources (e.g. LEDs) and to achieve a uniform and collimated illumination with a pyramidal light pipe.

$1^{st}$ Proposal:

The first proposed set-up, consists of a colour cube for collecting and multiplexing the light of the single colour-light sources, and a pyramid light pipe for the homogenisation and collimation of the illumination, see FIG. 13.

Note that an air gap is required between the light sources and the colour cube as well as between the colour cube and the light pipe. The air gap reflects by TIR (total internal reflection) the rays which would otherwise escape the cube. These rays would either be absorbed or propagate in an undesired direction, producing optical losses. Note that some rays are practically unaffected by the air gap $2^{nd}$ Proposal:

The second proposal uses a sequence of dichroic filters to combine the different colour sources, see FIG. 14.

It should be noted that the dichroic filters are in glass cubes, called hereafter dichroic cubes. The light sources, the dichroic cubes, and the light pipe are separated by an air gap. As for the 1st proposal, the air gap allows to guide ray by TIR and minimize optical losses. The use of dichroic filter on glass plates would also let rays escape in undesired directions producing optical losses.

The $2^{nd}$ proposal is less compact than the 1st proposal, but it is simpler technologically speaking. It is therefore cheaper to realize, in particular for very compact dimensions.

$3^{rd}$ Proposal:

For compact configuration, the first two proposals may be difficult to manufacture. For example, in the case of the illumination of a 0.7" LDC m-display, the cube edge has a typical size between 2.0 mm and 4.0 mm.

A way to relax the cube dimension constraint is shown in FIGS. 15 and 16. The two configurations are functionally equivalent. However the positioning of the cube in an intermediate position is compacter It should be noted that the cube is surrounded by air gaps in order to minimize optical loses, as already explained. However, when the source is directly in front of the light pipe, there is no need to include an air gap between the source and the light pipe. Actually when using surface mounted LEDs, the light extraction efficiency of the source is increased when the pipe is in contact with the LED surface. This results in significant increase of the overall optical efficiency.

The semiconductor active surface emits rays in random directions. Due to the high refractive index of the semiconductor when compared to the refractive index of the epoxy layer, part of the rays are trapped by TIR. The same happens for part of the rays between the epoxy and the air gap. However when the epoxy is in contact with the light pipe, all the rays leaving the epoxy are coupled into the light pipe, as the refractive index of the epoxy and the refractive index of the pipe can be (need to be) chosen close to each other (close to index matching condition).

Reminder: Total Internal Reflection Condition

For a ray in a high refractive index medium reaching the interface with a lower refractive index medium, if the angle of incidence is larger than the critical angle, then the ray is totally internal reflected. Otherwise the ray is refracted and propagates in the low refractive index medium, see FIG. 26.

Prism Coating:

When using colour or dichroic cubes for the proposed illumination configurations, the full dichroic surface is used. In other words, the full surface should be coated by the dichroic filter. In practice however, the coating does not stick to the surface close to the edges (see FIG. 12). When the prism size is small, the uncoated margin represents a significant proportion of the surface. This results in optical loses as the colours rays are not correctly redirected when falling on the uncoated margins.

A way to turn around the uncoated margin problem consists of coating a thin glass plate whose dimensions are bigger than the prism cross-section. The plate is then glued between two prisms. The uncoated margin being out of the prisms cross-section, the efficiency of the dichroic filter is optimised.

The proposal inter alia allows to combine sources of different colours and to uniformly illuminate a surface in a very in compact embodiment; this with minimal optical losses. Our proposal also show how to relax the dimension requirements on the colour cube.

These and further aspects will also be elucidated in the following:

The present invention inter alia also relates to a light extraction mechanism for LED illuminators.

The optical efficiency of a LED based illumination device depends on the design and assembly process between the light source and the collimation optics. We present an original optimised design as well as an assembly/manufacturing technique suitable for low cost mass-production.

The outcoupling or extraction efficiency of LEDs is generally done by the LED manufacturer by applying a microstructure on the chip surface or by giving a special shape to the encapsulating material (e.g. LED with epoxy lens).

The invention inter alia proposes an illumination architecture based on light pipes. It is further proposed a system for which two optical elements are coupled with a index matching fluid.

Some aspects of the present invention consist of:
improved light pipe efficiency by combining total internal reflection (plain pipe) and mirror reflection (hollow pipe), and
conception of a assembly scheme for efficient lighting and low cost mass-production.

The invention inter alia intends to provide solutions for the following main problems:
1) An assembly technique is proposed for low cost mass-production.
2) The combination of a plain and hollow pipes optimises the device illumination efficiency.

As explained above, the combination of a LED array and a pyramidal light pipe constitutes an efficient and compact illumination system which can be, for example, used for the illumination of micro-displays used in projection application.

The light pipe can either be a plain light pipe for which the rays are guided by total internal reflection (TIR), or an hollow pipe whose internal faces are mirror coated (metallic reflection). The advantage of plain pipes is that the redirection of ray by TIR is loss less. The advantage of hollow pipes is that they can be made shorter, as the rays propagating in air have larger angles and meet the light pipe faces after a shorter distance. On the other hand, the mirror reflection of hollow pipe produces optical losses (typical mirror reflectivity varies between 92% to 98% depending on angle of incidence and mirror material).

Key parameters of such an illumination engine are:
1) the illumination efficiency η,
2) the uniformity of illumination, and
3) the compactness of the device.

The illumination efficiency η is defined as $$\eta = \frac{\phi_{opt}}{\phi_{LED}},$$

where $\phi_{LED}$ is the flux emitted by an LED and $\phi_{opt}$ is the flux provided by the illumination engine within the limited aperture (solid angle) of the optics.

The state-of-the art of the LED light pipe illuminator suffers of following defaults
A. For plain light pipes: non optimal optical efficiency due to ray escaping the light pipe laterally, see FIG. 29A.
B. For plain light pipes: non optimal optical efficiency due to non perfect index matching between the LED source and the light pipe, see FIG. 30A.
C. For hollow pipes: non optimal efficiency due to poor LED extraction efficiency, see FIG. 31A.

As explained hereafter, the invention inter alia consists in avoiding these three shortcomings, as well as in proposing an efficient assembly solution well suited for mass production.
Ad A: Optimisation of Light Guiding Plain light pipes suffer some losses as some ray reach the pipe faces out of the TIR condition. Note that this effect only happens for rays with large propagation angles at the beginning of the pipe, where the rays have still not been deflected.

It is proposed to overcome the loss of optical efficiency produced by the rays escaping laterally by coating the first section of the light pipe with a mirror. Alternatively, the plain light pipe can be plugged into a small hollow pipe. This way, the rays are guided by metallic reflection in the first section of the light pipe (with some minimal reflection losses), but are guided by TIR for the rest of the light pipe (without losses), see FIG. 29B.
Ad B: Optimisation of LED-to-Pipe Coupling The light extraction efficiency of LEDs is limited by the rays which are trapped by TIR. The TIR is the consequence of the difference of index between the LED protective layer (e.g. epoxy or silicone) and the air. This can be avoided when there is an refractive index matching between the LED and the light pipe. A good index matching is achieved when there is no air gap between the LED protective layer (and the light pipe (e.g. PMMA). In practice, this is difficult to achieve due to the imperfect surface flatness of the LED protective layer. Typical indices vary with wavelength and gave values for silicone of about 1.46, for epoxy of about 1.53, and for PMMA of about 1.49.

The way to avoid any the air gap between the LED and the light pipe is to insert a fluid (liquid, gel, and/or glue) whose index of refraction corresponds to those of the pipe and the LED protection layer. Note that due to capillarity forces, the fluid sticks between the two parts, see FIG. 30B.
Ad C: Optimisation of Hollow Pipes Efficiency Due to their nature, hollow pipes cannot improve LED extraction efficiency by index matching, as LED-to-pipe coupling is not possible. To avoid this problem a small plain pipe section whose role is to increase LED extraction efficiency is inserted to make a first ray redirection. This way the advantage of hollow pipes (shorter that plain pipe) and plain pipes (high extraction efficiency) is combined, see FIG. 31B.
D: Optimisation of Assembly Process The LED-to-pipe assembly process has to fulfil the following conditions:
1. Fix together the optical components (LED and light pipe)
2. Preserve the optical properties of the device (high optical efficiency)
3. Be as simple as possible in order to reduce costs of the mounting process for mass-production The invention is based on a configuration which, as discussed, has a high optical efficiency. In order to keep costs as low as possible, it is proposed to use a glue as index matching material and to use the specially shaped hollow pipe in order to fix the different components laterally.

Possible steps of the assembly process are:
1) Position the specially shaped light pipe on top/around of the LED
2) Deposit a droplet of index matching glue
3) Press the plain light pipe against the LED
4) Fine tune the horizontal alignment of the light pipes and the LED
5) Cure of the glue. Depending on the glue, the curing is either done thermally, by infrared illumination, or by ultraviolet illumination.

In order to maximize the light extraction efficiency, it is important that the volume of the glue droplet is big enough to fill the air gap volume between the plain pipe and the LED. The air gap volume between the LED and the pipe is hard to predict with precision as it depends on the LED manufacturing process (deposition process of the epoxy). By precaution, the volume of the glue is chosen with some margin. As illustrated in FIGS. 32A and 32B, the glue in excess finds its place is the space available between the lateral faces of the LED and the hollow pipe basis.

The invention solves the following problems of the state-of-the art:
For plain light pipes: non optimal optical efficiency due to ray escaping the light pipe laterally.
For plain light pipes: non optimal optical efficiency due to non perfect index matching between the LED source and the light pipe.
For hollow pipes: non optimal efficiency due to poor LED extraction efficiency.

Moreover, the invention proposes a cheap and efficient assembly process optimised for mass-production.

In the following the invention will be described in more detail taking reference to the accompanying Figures.

FIGS. 5-9 illustrate further embodiments of the present invention for multiple colour applications.

FIGS. 10-12 illustrate some of the theoretical background.

FIG. 28 shows an alternative method for coating prisms according to the present invention.

FIG. 29A, 29B are cross-sectional side views of embodiments of the present invention without and with a respective light collecting and/or guiding improving arrangement, respectively.

FIG. 31A, 31B are cross-sectional side views of embodiments of the present invention without and with a respective light collecting and/or guiding improving arrangement, respectively.

FIG. 32A, 32B are cross-sectional side views of further embodiments of the present invention demonstrating a mounting process with respect to a respective light collecting and/or guiding improving arrangement.

The following description is directed to preferred embodiments of the present invention, in particular with respect to said first solution by taking reference to FIGS. 1 to 12.

Figure 1:
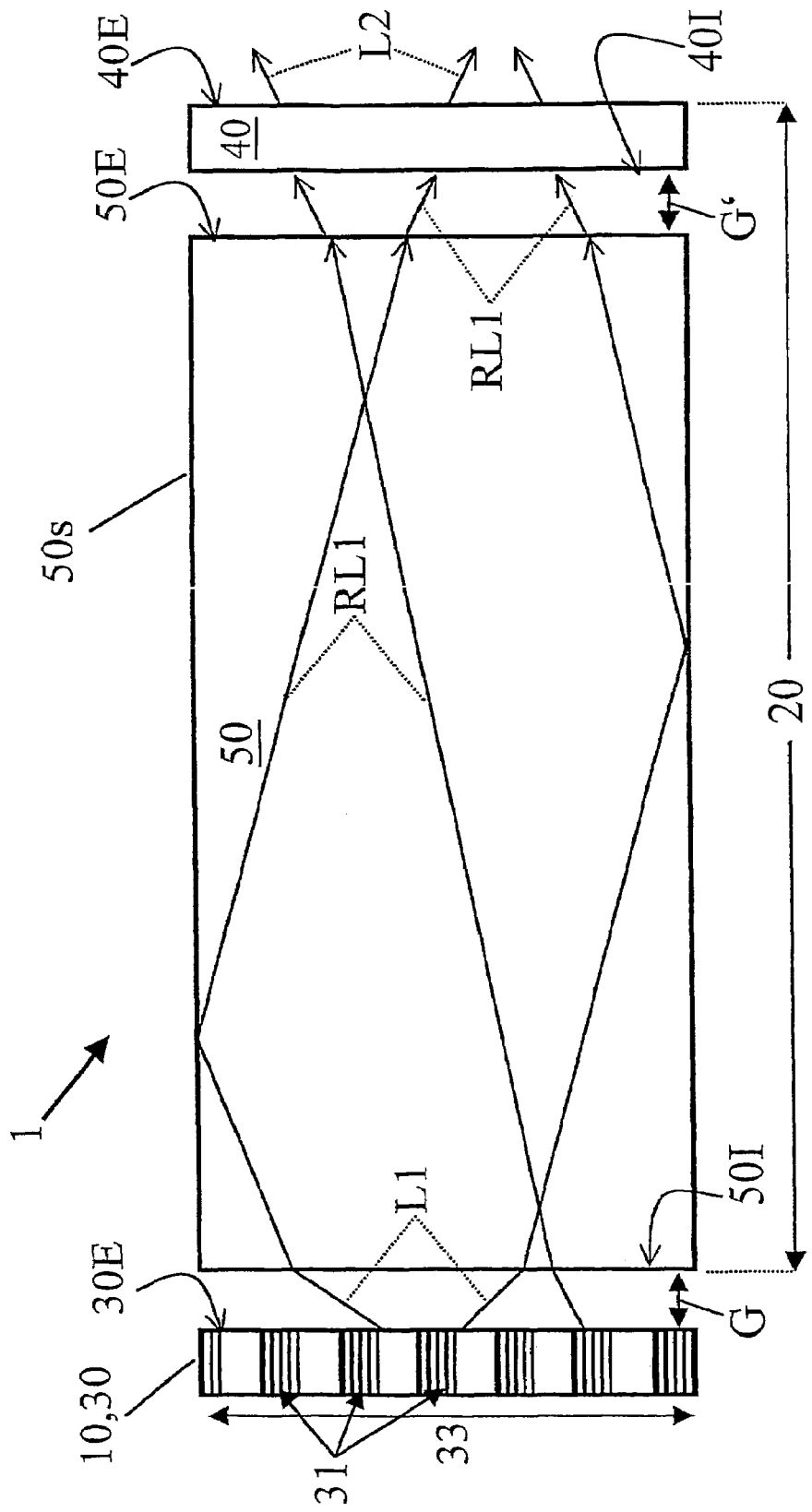
FIGS. 1, 2 illustrate a first preferred embodiment of the inventive illumination arrangement.

FIG. 1 demonstrates by means of a schematical and cross-sectional side view a first preferred embodiment of the inventive illumination arrangement 1.

The embodiment of FIG. 1 consists of a light source device 10, which is built-up by a solid state light source device 30. The solid-state light source device 30 of the embodiment of FIG. 1 consists of an array 33 of light emitting diodes 31. Said array 33 is formed to have a light emitting area or light emitting aperture 30E from which primary illumination light L1 is emitted to reach an incidence aperture 50I of a light collecting, integrating and redirecting device 20 which may consist as in the example of FIG. 1 of a light integrating device 50 and of a light valve device 40, the former of which is in this case formed as an integration or integrator rod 50 of a solid bulk material, for instance glass, plastic, or the like.

Rays of primary illumination light L1 entering, said integrator rod 50 via said light incidence aperture 50I are first of all refracted according to the Snell's law of refraction and according to a refractive index of the material of the integrator rod 50 being larger than the refraction index of the gap material of the gap G between said integrator rod 50 and the light source device 10. During the passage of the primary illumination light rays L1 within the material of the integrator rod 50 said rays of light are reflected at the side walls or faces 50s of the integrator rod 50. Finally, after a plurality or multiplicity of reflections at the side walls 50s each of said received and multiply reflected rays of light of the primary illumination light L1 exits from the integrator rod 50 via output aperture 50E and then enters the light valve 40 being situated in direct proximity to the light output aperture 50E.

After exiting said integrator rod 50 via output aperture 50E, the light distribution in the second gap G' between the integrator rod 50 and the light valve 40 is more uniform than the light distribution at the first gap G between the light source device and the integrator rod 50.

Figure 2:
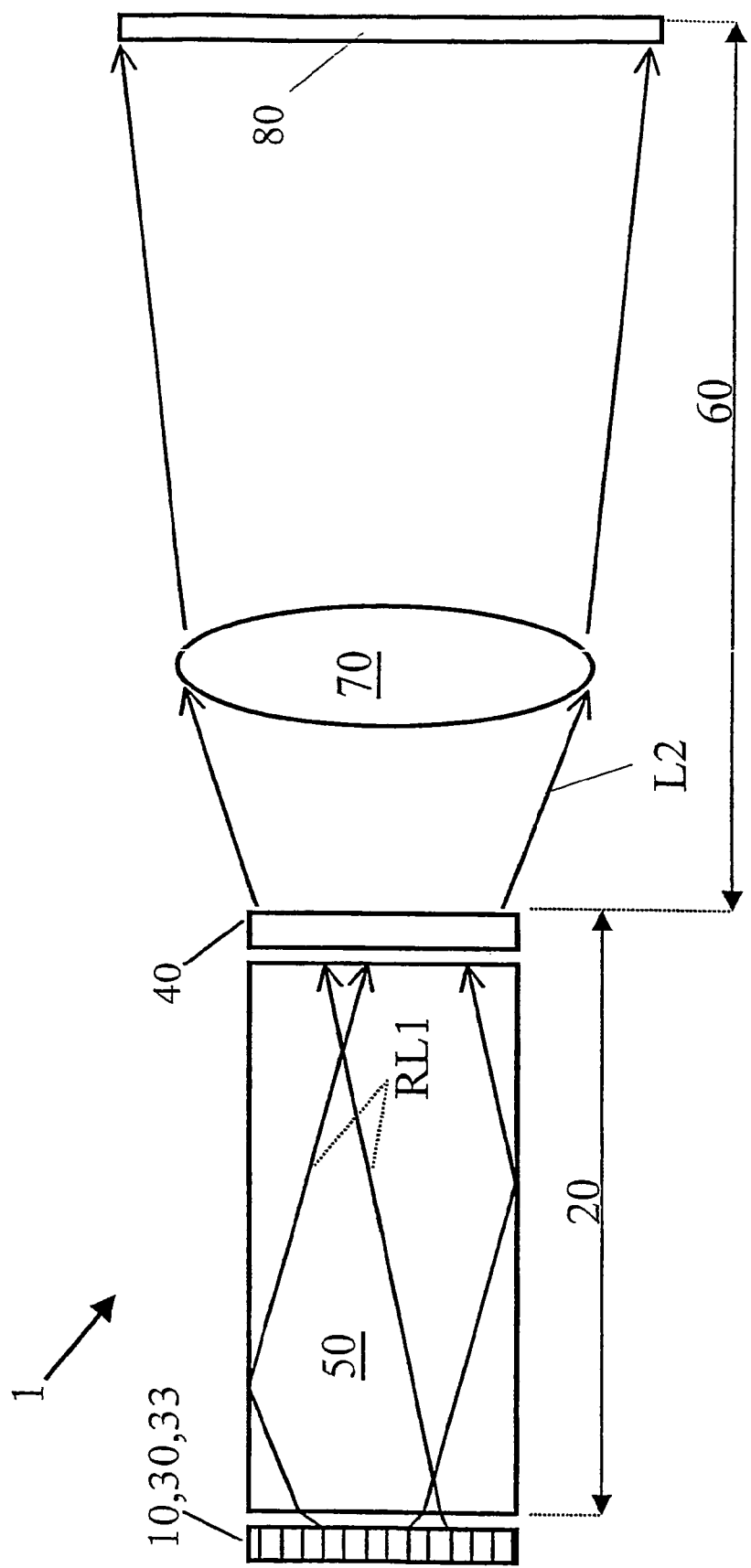

After receiving the redirected primary illumination light RL1 the respective rays of light are allowed to pass through the light valve 40 in a controllable manner and they leave the light valve 40 as secondary illumination light L2 to enter certain projection optics 70, shown in FIG. 2, and then entering a display screen 80.

Figure 3:
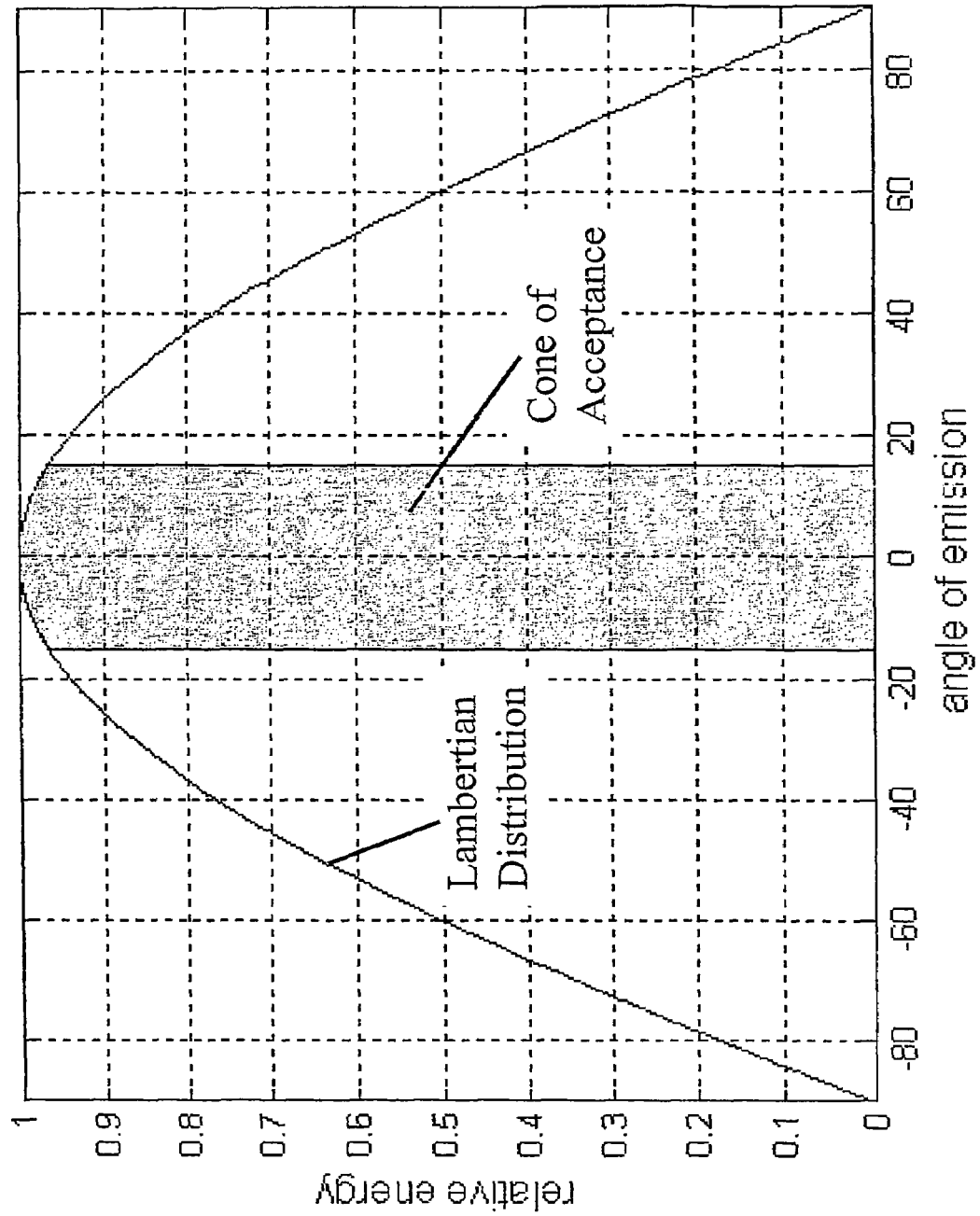
FIG. 3 shows a graph which illustrates the relative emission of light as a function of the direction angle of emission for a light emitting diode.

The gap G between the light source device 10 and the integrator rod 50 which is shown in FIGS. 1 and 2 is of particular importance as even in the case of an array of light emitting diodes each of said diodes 31 only has a minor directive emission capability because the light distribution or energy distribution of emitting light waves obeys a Lambertian distribution as shown in FIG. 3. FIG. 3 demonstrates this Lambertian distribution as a graph demonstrating the relative energy of emitted light for a light emitting diode 31 as a function of the emission angle. From the distribution of FIG. 3 it can be derived, that it is necessary to keep the gap width of the gap G between the light source device 10 and the integrator rod 50 as narrow as possible to increase the integral or the amount of primary illumination light L1 entering the area of incidence or incidence aperture 50I.

Figure 4A:
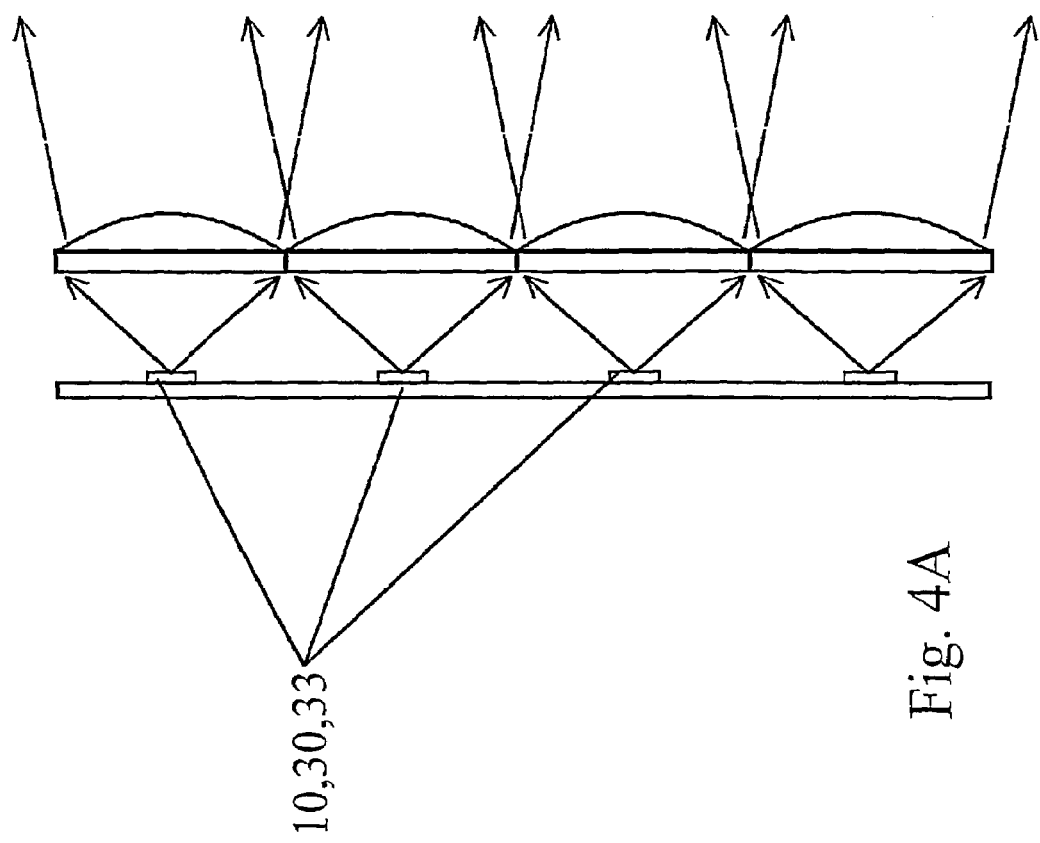
FIGS. 4A, 4B show details of further embodiments of the present invention.
Figure 4B:
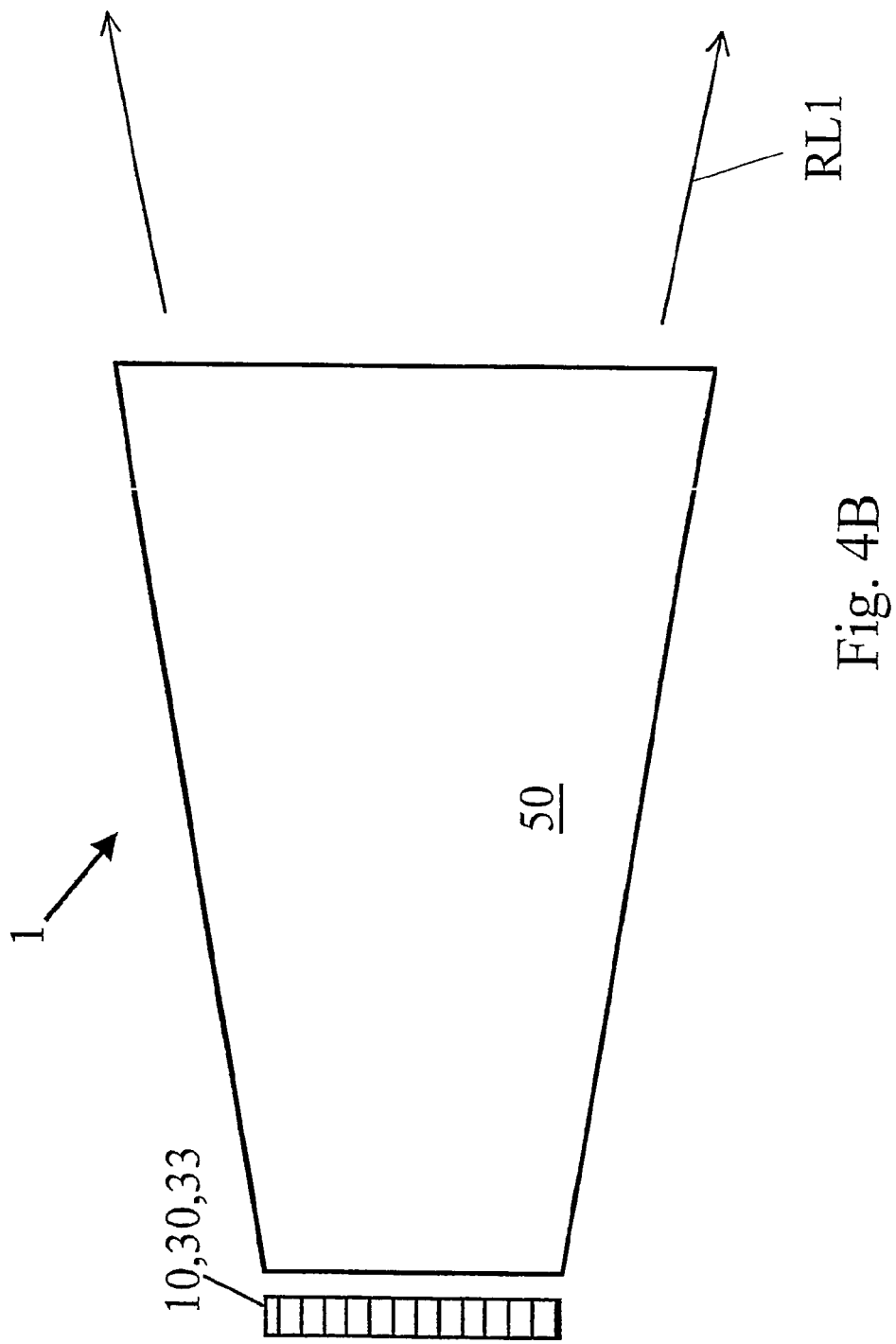

As can be seen from FIG. 2, the cones of acceptance of the integrator rod 50 and the displaying optics 70 may be different. Therefore, it could be necessary to adapt said cones of acceptance. This can be done alternatively by employing fly-eye-optics as shown in FIG. 4A or more preferably by using an integrator rod 50, having a pyramidal cross-section as shown in FIG. 4B.

FIGS. 5 and 7 to 9 demonstrate different possibilities of combining solid state light source devices 30 of different colours to obtain a multi-colour illumination arrangement for a multi-colour projection system.

Figure 5:
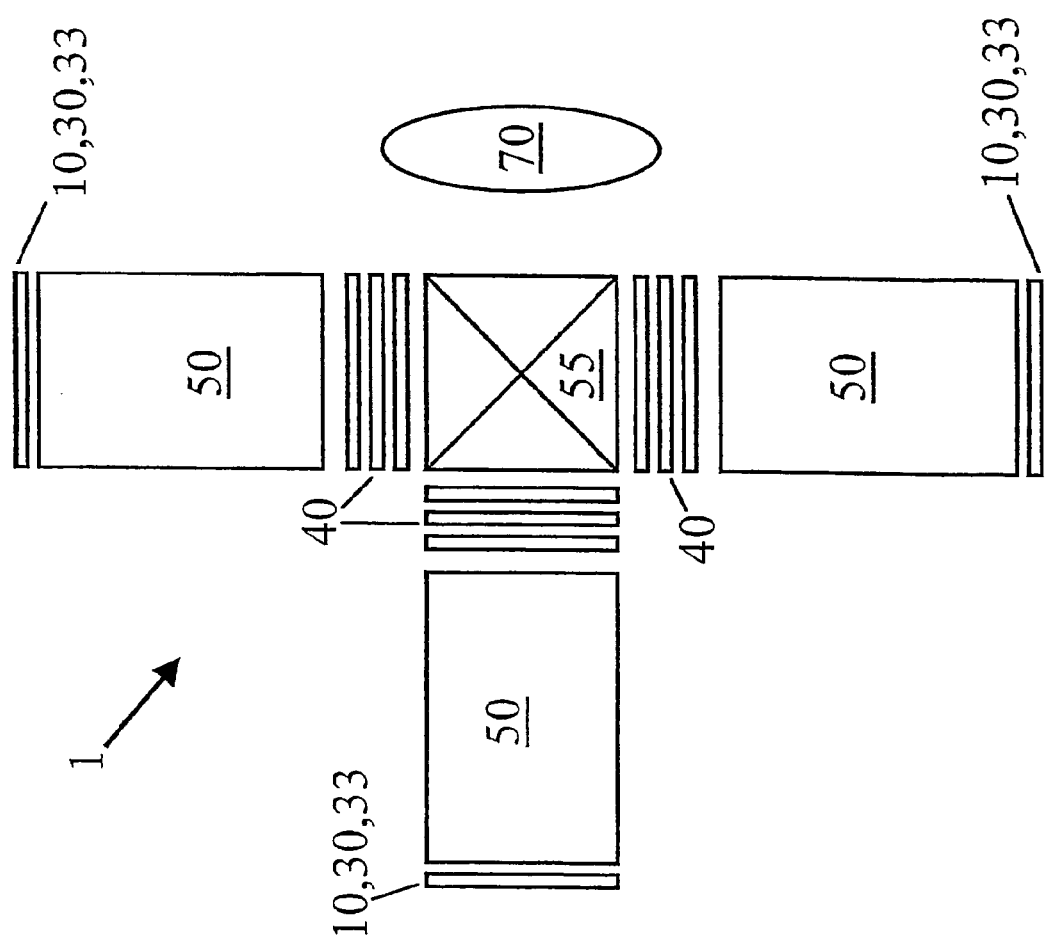

In FIG. 5 three different coloured solid state light source devices 30 having e.g. light emitting diode arrays 33 are given, each of said solid state light source devices 30 and therefore each of said light emitting diode arrays 33 being associated with an integrator rod 50 interposed between said solid state light source device 30 and a light valve arrangement 40, so that for each of said light source devices 30 of different colours an arrangement similar to that shown in FIG. 1 is given.

To combine the three different colours of said three different solid light source devices 30 a light mixing device 55 or colour cube 55 common for each of said three arrangements is given being capable of receiving the respective secondary illumination light L2, to mix them up, and to allow them to pass over to the projection optics 70.

Figure 6A:
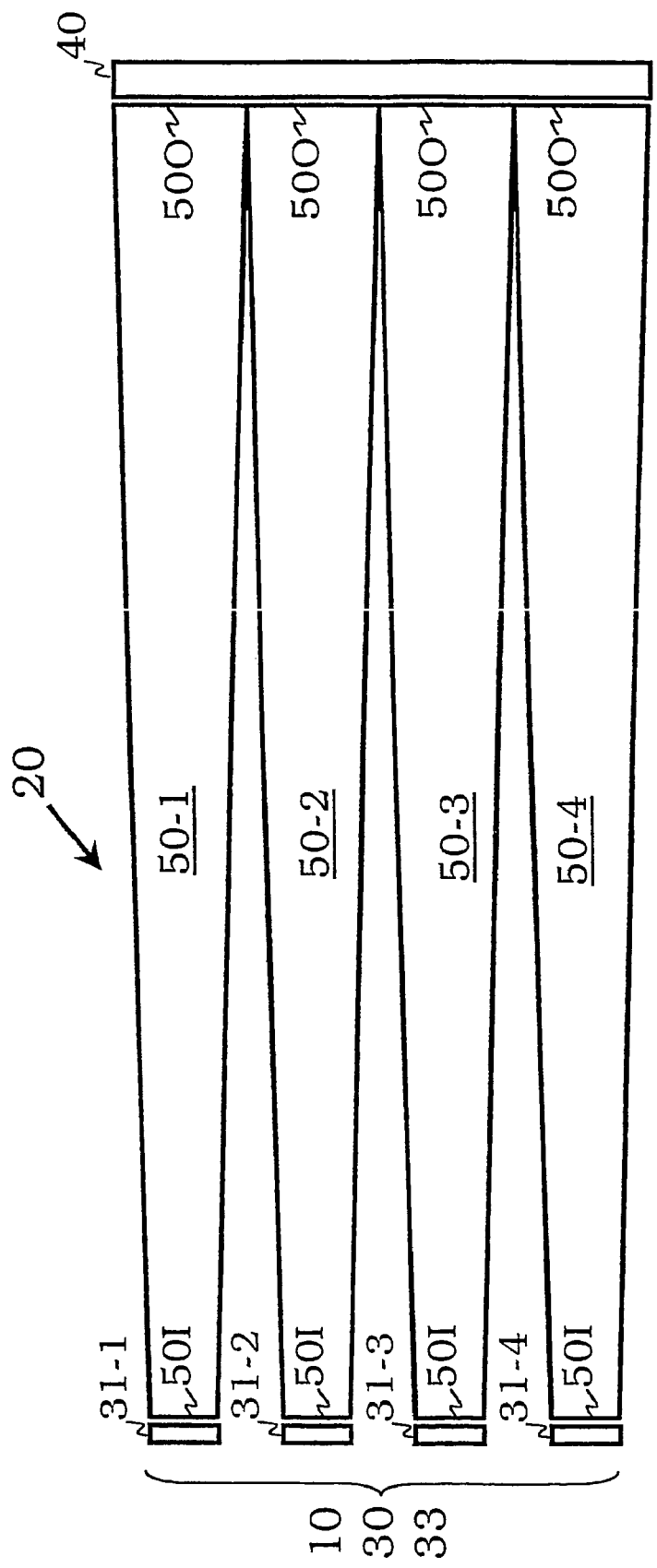
Figure 6B:
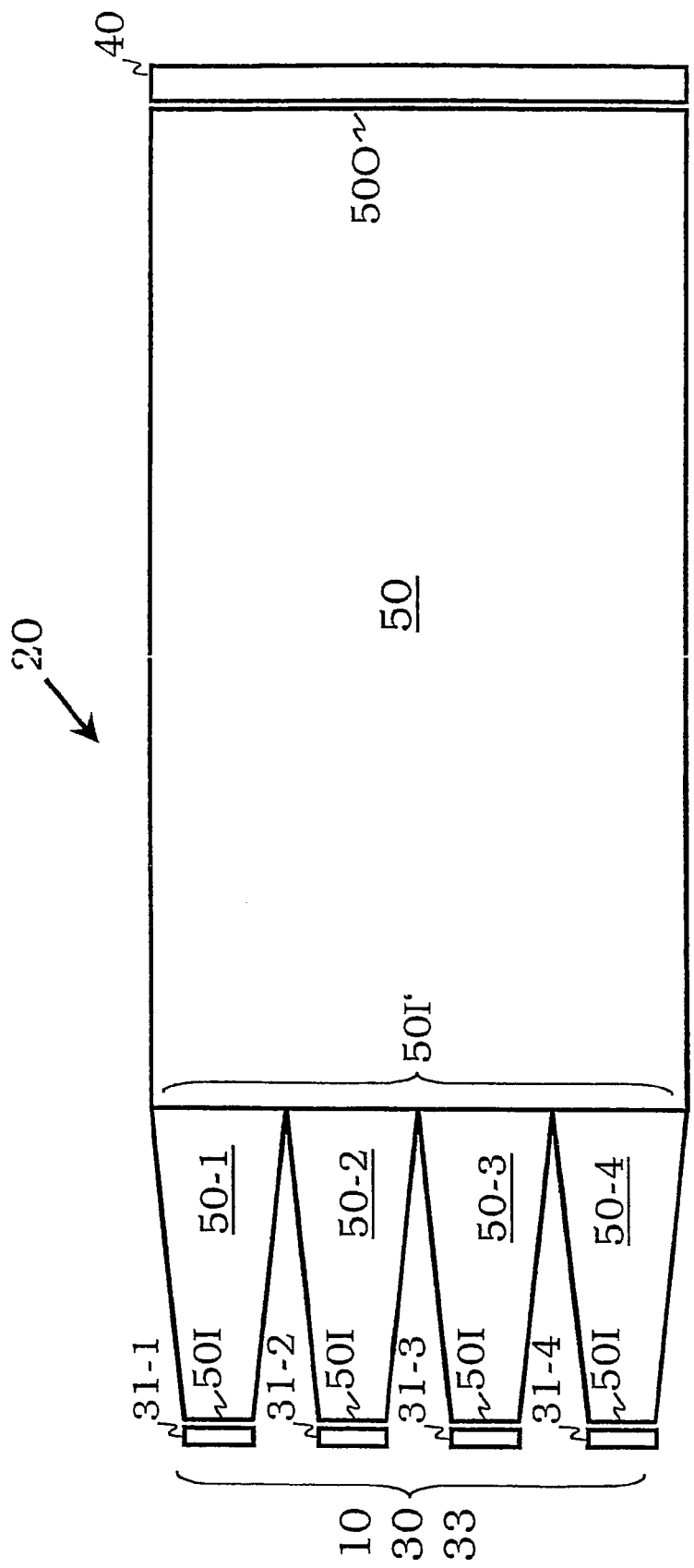
Figure 6C:
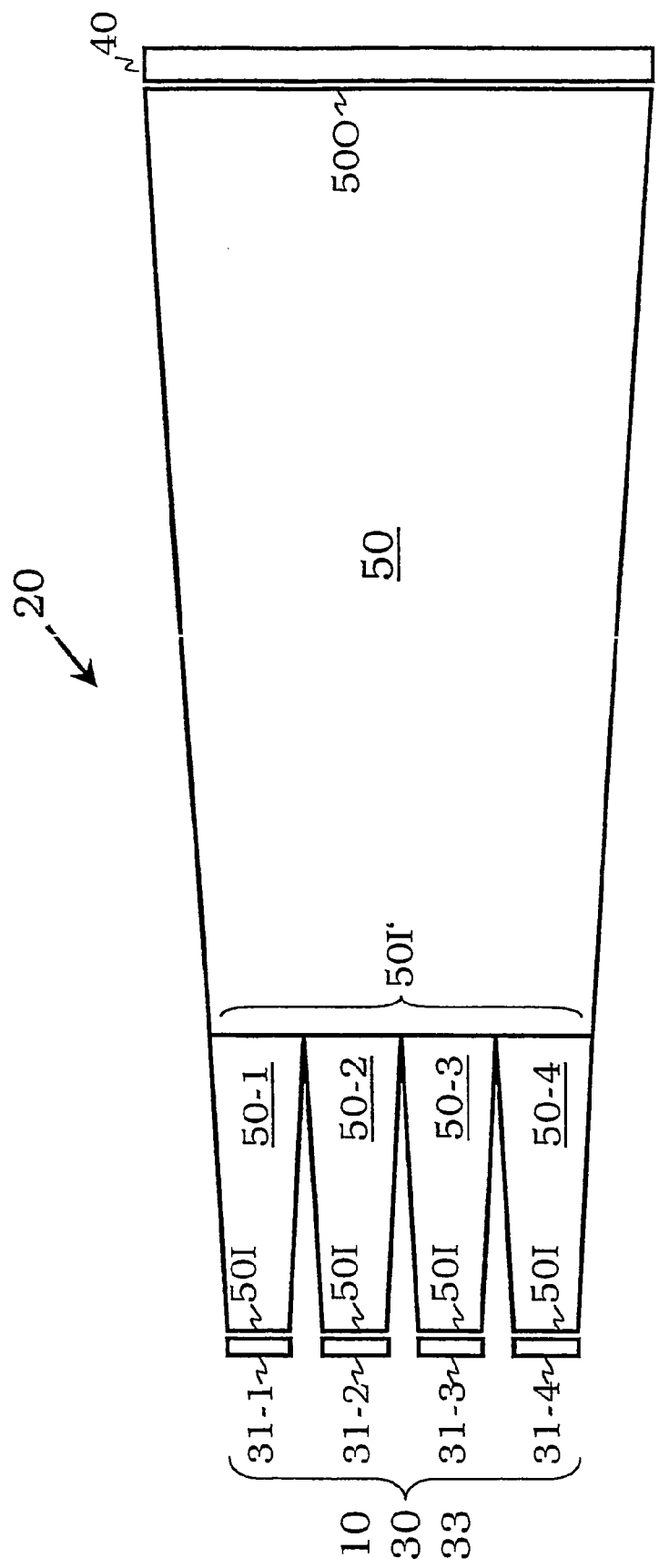

FIG. 6A to 6C show different embodiments of the light collecting, integrating and redirecting unit or device 20 in the form of different integrator rod arrangements each of which being adapted for an array 33 of LEDs 31 or 31-1 to 31-4 as a light source device 10 and each of which being optically coupled to a light valve device 40.

In FIG. 6A the light collecting, integrating and, redirecting unit or device 20 is formed as a plurality of more or less similar or identical separated and parallely arranged single pyramidal integrator rods 50-1 to 50-4 each of which being uniquely assigned and coupled with its respective light entrance section 50I to a given LED 31-1, to 31-4, respectively. The light entrances 50I are in each case smaller than the respective light output sections 50O which are optically coupled to the light entrance section 40I of a common light valve device 40.

In FIG. 6B the more or less similar or identical separated and parallely arranged single pyramidal integrator rods 50-1 to 50-4 are optically coupled instead to the light entrance section 50I' of a common and integrator rod 50 the light exit 50O of which being optically coupled to the light entrance section 40I of a common light valve device 40.

The common integrator rod 50 of the embodiment of FIG. 6B has a uniform cross section, whereas the cross section of common integrator rod 50 of the embodiment of FIG. 6C is non-uniform and the respective integrator rod 50 is formed pyramidal.

FIGS. 7A and 7B demonstrate two different arrangements for realizing multiple colour illumination arrangements for multiple colour projection systems which differ from the embodiment of FIG. 5.

In the embodiment of FIG. 7A a solid state light source device 30 is employed as said light source device 10 which has a LED-array 33, the members of which, i.e. the distinct light emitting diodes 31, possessing different spectral emission ranges, i.e. different colours. After the passage of the primary illumination light L1 through the integrator rod 50 at the gap G' between the light valve 40 and the integrator rod 50, the uniform light distribution and the uniform colour distribution after passing the light valve 40 is then directed to the projection optics 70.

In the case of the embodiment of FIG. 7B three different coloured solid state light source devices 30, each of which being built-up by an array 33 of light emitting diodes 31 have distinct spectral ranges or colours with respect to each other. The primary illumination light L1 of each of said single solid state light source devices 30 is directed to the light mixing device 55 which after mixing directs the output light to the integrator rod 50 to obtain a secondary illumination light L2 at the gap G' between the light valve 40 and the integrator rod 50 having a uniform illumination and colour distribution.

Figures 8A, 8B:
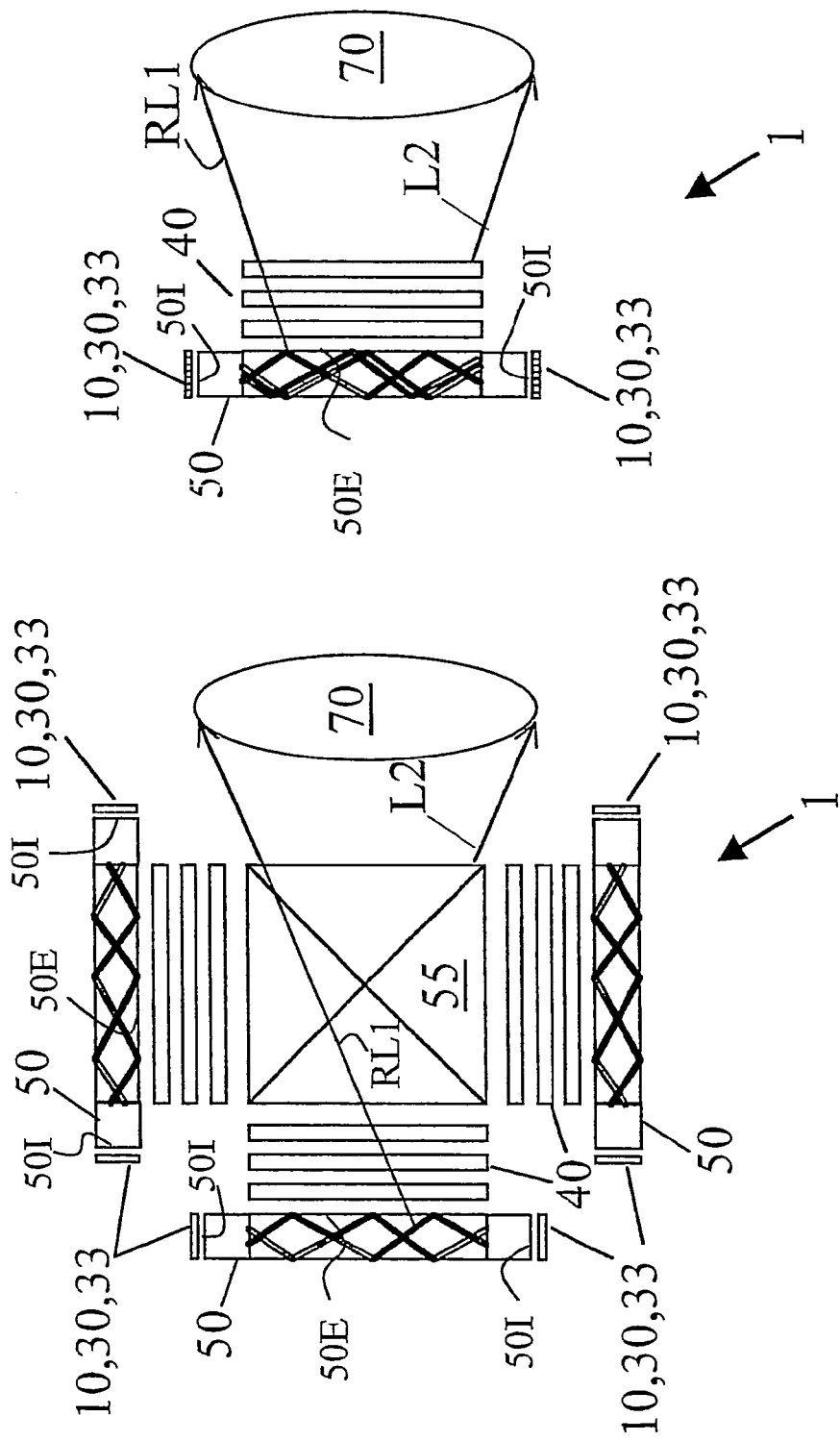

FIGS. 8A and 8B demonstrate further examples of multiple colour illumination devices. In these cases illumination light pipes 50 are used for redirecting and making uniform received amounts of primary illumination light L1. In contrast to the embodiments discussed above, where the incidence aperture 50I at which primary illumination light L1 enters the distinct integrator rod 50 and the output aperture 50E are disposed in parallel to each other, the incidence apertures 50I and output apertures 50E of the embodiments of FIGS. 8A and 8B are perpendicular to each other. Therefore, primary illumination light L1 emitted by solid state light source devices 30 of the embodiments of FIGS. 8A and 8B enters the associated illumination light pipes 50 at their base faces, whereas the redirected primary illumination light RL1 exits from said illumination light pipes 50 at side faces thereof.

A difference between the embodiments of FIGS. 8A and 8B is that for obtaining a multi-colour arrangement in FIG. 8A a plurality of single coloured solid state light source devices 30 or LED-arrays 33 is necessary, whereas in the embodiment of FIG. 8B multiple coloured solid state light source devices 30 or LED-arrays 33 are provided.

Of course, in the embodiment of FIG. 8A according to the multiplicity of single-coloured solid state light source devices 30 again a light mixing device 55 is necessary.

Figure 9:
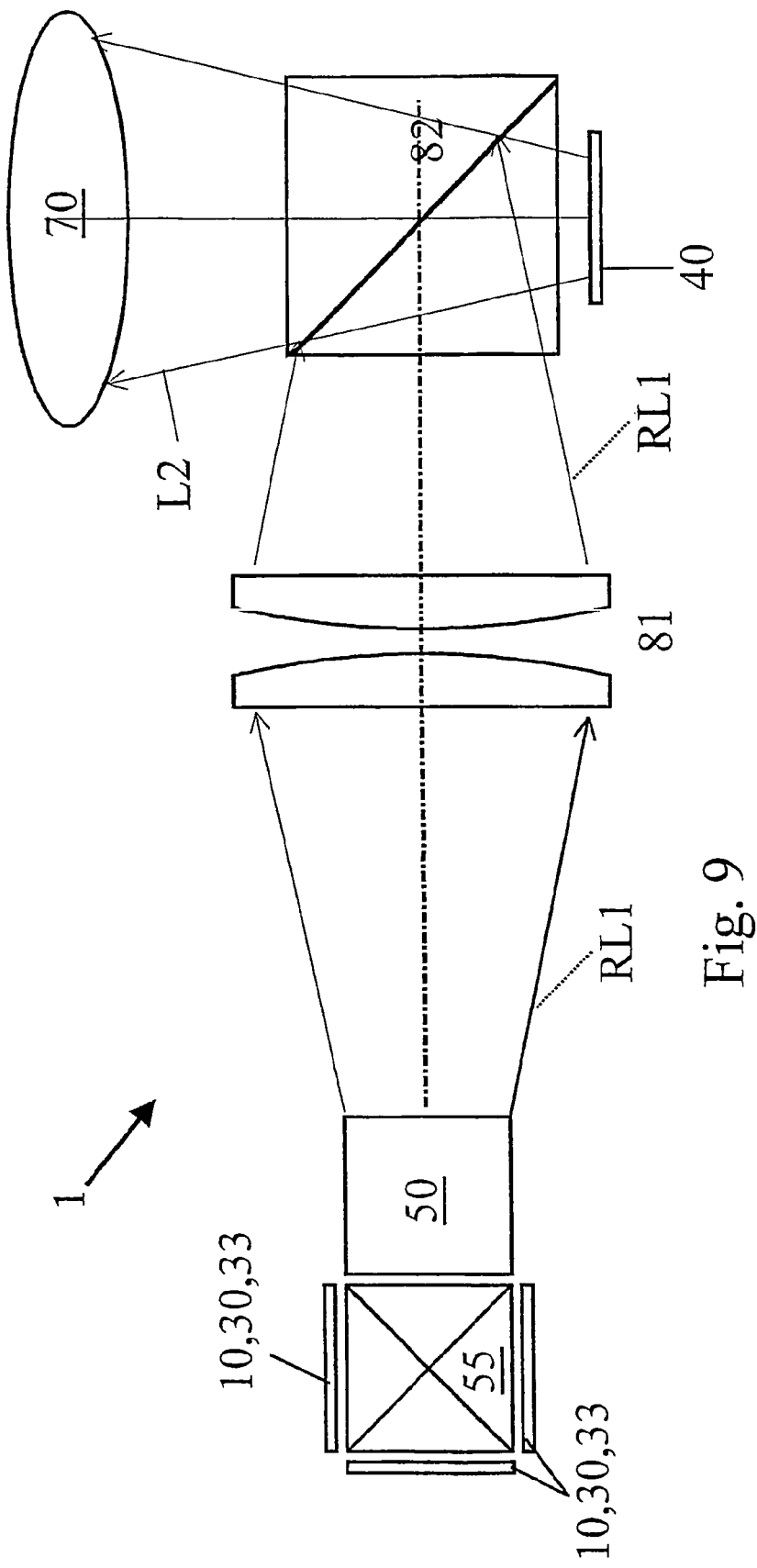
Figure 11:
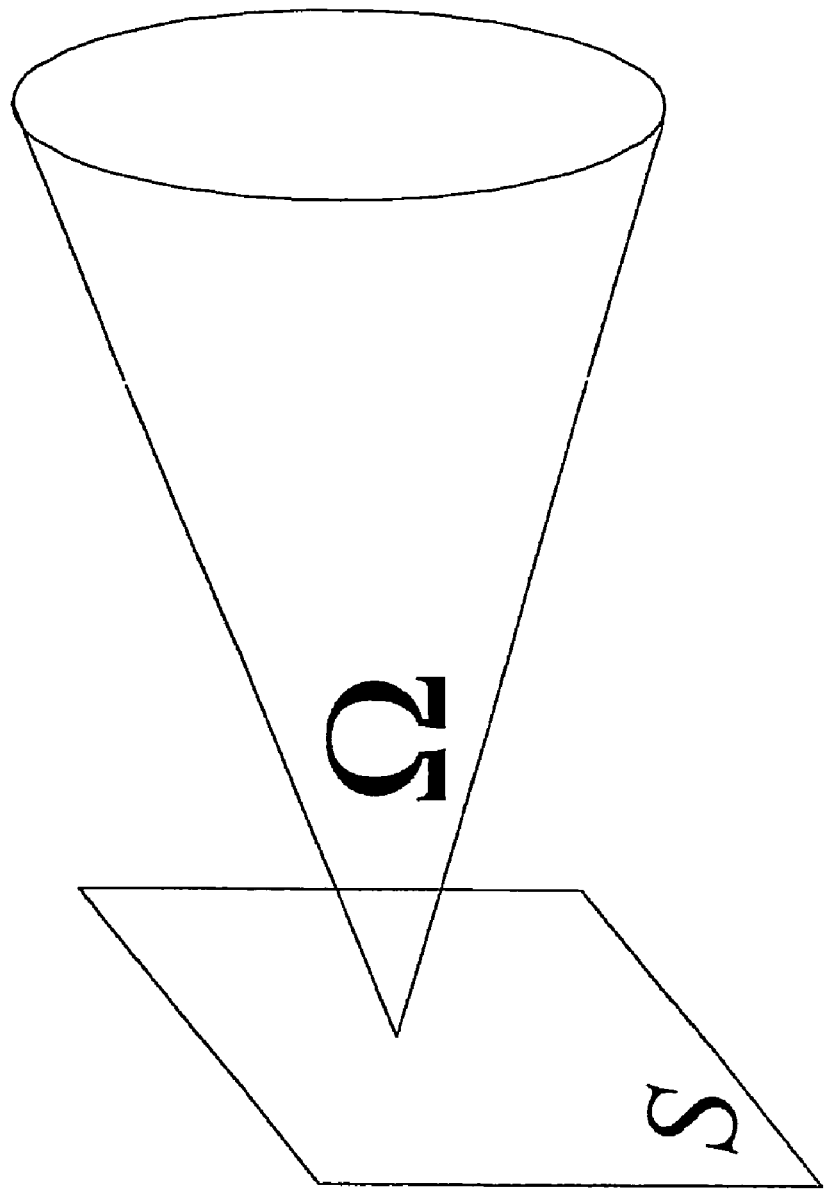
Figure 12:
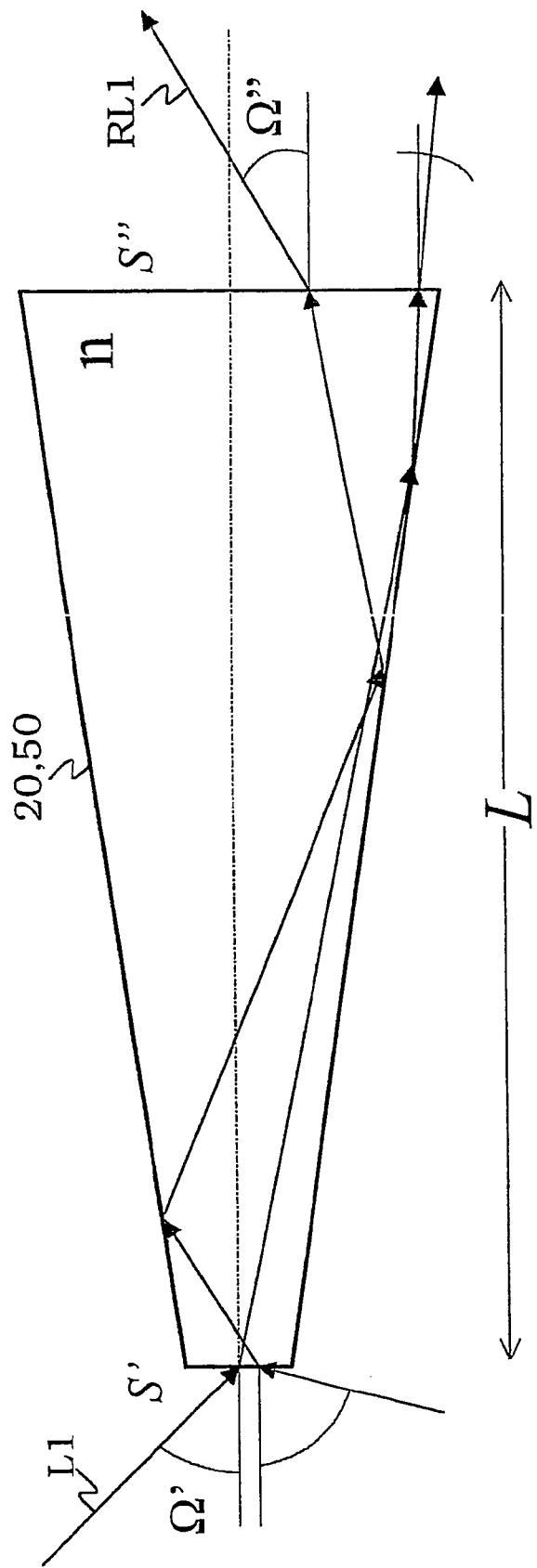

The embodiment of FIG. 9 demonstrates an application of the embodiment of FIG. 7B, having intermediate optics 81, 82 for adapting the cones of acceptance between the integrator rod 50 and the light valve 40. The intermediate optics 81, 82 consists of a lens arrangement 81 and a polarization beam splitter 82 which in combination with each other transforms or maps the cone of acceptance of the integrator rod 50, i.e. the geometry of the redirected primary illumination light RL1, to the cone of acceptance of the light valve 40, which is in the embodiment of FIG. 9 a reflective light valve 40 which allows the passage of secondary illumination light L2 to the projection optics 70 upon reflection at the interface of light valve 40.

In the following description, some general remarks about dichroic filters and color cubes and further remarks with respect to the present invention, in particular with respect to said second and third solutions will be given by taking reference to FIGS. 13 to 28.

Color combination can either be achieved by using a combination of dichroic filters or by using a color cube.

Figure 22:
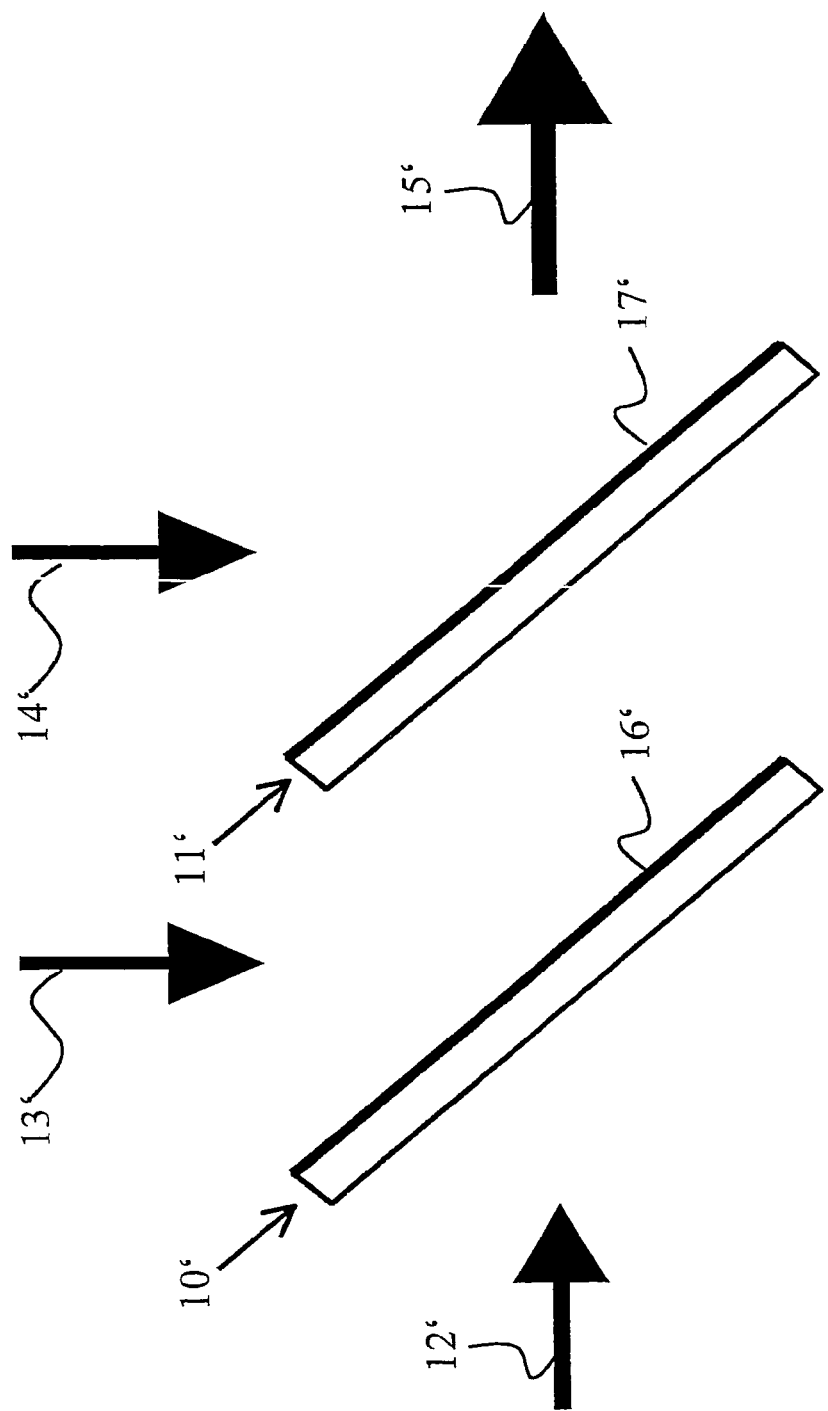
FIG. 22 shows a first embodiment of a combination of dichroic filters.

FIG. 22 shows a combination of a first dichroic filter 10' and a second dichroic filter 11'. The two dichroic filters 10', 11' are realized as glass plates being coated by respective transmissive/reflective films 16', 17'. Each dichroic filter reflects one single color (for example red or green) and transmits all other colors. In this example, the first dichroic filter 10' transmits a first color beam 12', having for example blue color and reflects a second color beam 13', of for example red color. The second dichroic filter 11' transmits the first color beam 12' and the reflected second color beam 13' and reflects a third color beam 14', of for example green color. Thus, a combined color beam 15' is generated.

Figure 23:
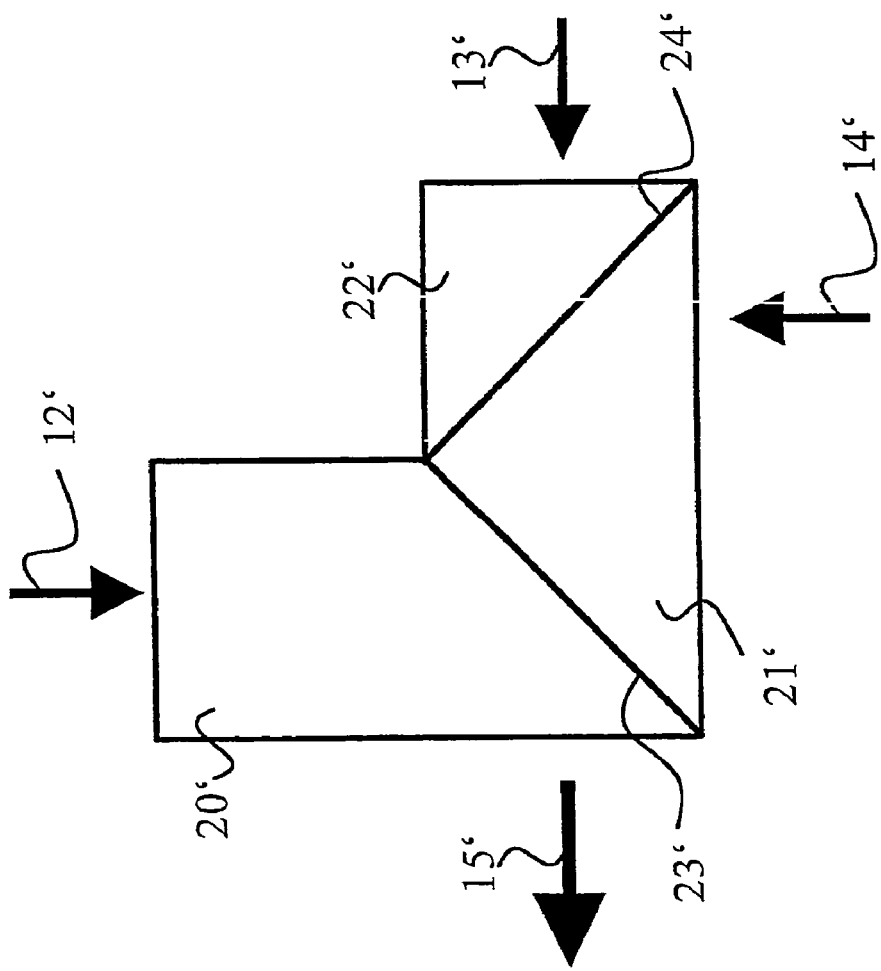
FIG. 23 shows a second embodiment of a combination of dichroic filters.
Figure 24:
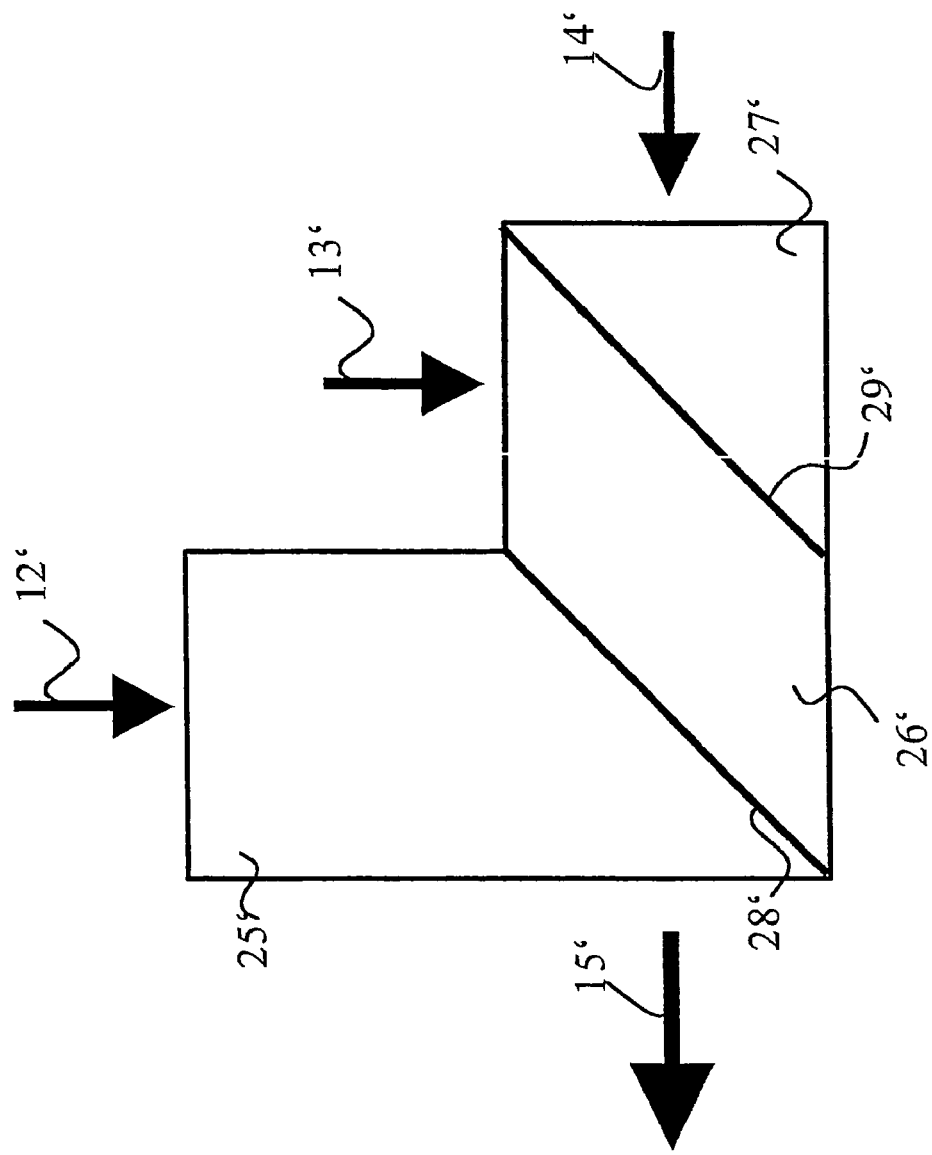
FIG. 24 shows a third embodiment of a combination of dichroic filters.

As can be taken from FIGS. 23 and 24, combinations of dichroic filters can also be realized as combinations of coated prisms of for example glass. The combination of dichroic filters shown in FIG. 23 comprises a first to third prism 20' to 22'. Between the first prism 20' and the second prism 21' a first reflective/transmissive film 23' is provided. Further, between the second prism 21' and the third 22' a second reflective/transmissive film 24' is provided. The first transmissive/reflective film 23' reflects the first color beam 12' of, for example, blue color. The second transmissive/reflective film 24' reflects the third color beam 14' of, for example, green color and transmits the second color beam 13' of, for example, red color. The reflected third color beam 14' and the transmitted second color beam 13' pass the first transmissive/reflective filter 23'. As a consequence, a combined color beam 15' is generated.

FIG. 24 shows another example of a combination of dichroic filters being realized by coated prisms. In this combination, a first to third prism 25' to 27' are provided. Between the first prism 25' and the second prism 26 a first transmissive/reflective film 28' is provided. Between the second prism 26' and the third prism 27' a second transmissive/reflective film 29' is provided. Analogous to the embodiment shown in FIG. 23, the properties of the first and second transmissive/reflective films are chosen in a way that the color beams 12' to 14' are combined into a combined color beam 15'.

Figure 25:
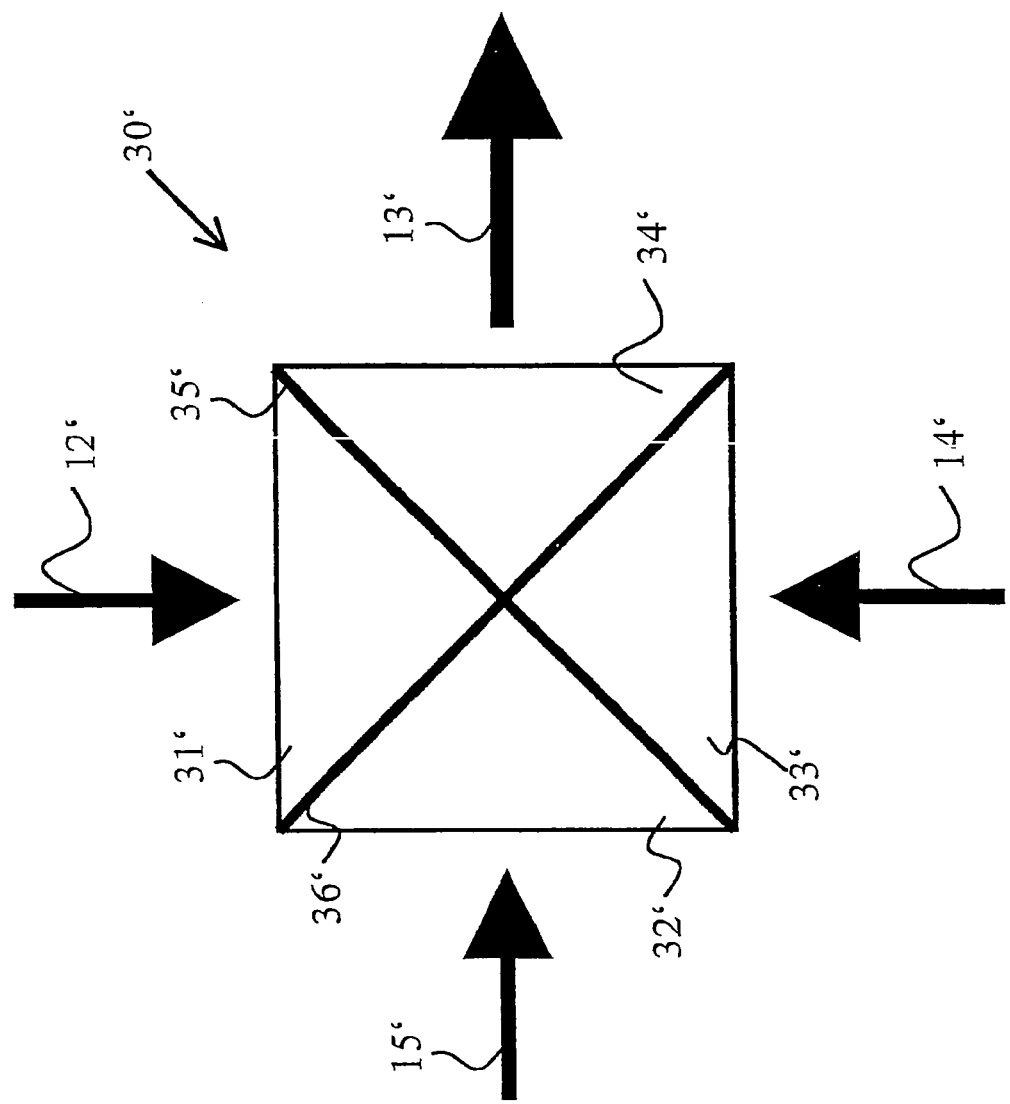
FIG. 25 shows an embodiment of a color cube.

FIG. 25 shows an example of a color cube. A color cube 30' comprises a first to fourth prism 31' to 34'. The prism surfaces forming the cube diagonals are coated in such a way that one color (for example, red or blue) is reflected, and all other colors are transmitted. Thus, a first transmissive/reflective film 35' and a second transmissive/reflective film 36' are provided. As a consequence, the color beams 12' to 14' are combined into a single combined color beam 15.

All examples of light mixing devices given above show possibilities to recombine different color beams into one single polychromatic output beam. It should be noted that these color combination schemes do not fulfill any function in order to homogenize the illumination produced by the output beam.

Making reference to FIG. 13, a first preferred embodiment of an illumination arrangement according to the present invention will be described. An illumination arrangement 40' comprises a first to third light source 41' to 43', a color cube 44' showing a first transmissive/reflective film 45' and a second transmissive/reflective film 46', a pyramidal light pipe 47', and a target surface 48' to be illuminated.

The function of the color cube 44' is to collect and multiplex different color beams generated by the light sources 41' to 43'. For example, the first light source 41' produces a blue color beam being reflected by the first film 45', whereas the third light source 43' generates a second color beam of red color being reflected by the second film 46'. The color beam of green color being generated by the second light source 42' passes both the first and the second film 45', 46'. Thus, a combined single output beam passes through an output surface 49' of the color cube 44' and is coupled into the pyramidal light pipe 47' through an input surface 50' of the pyramidal light pipe 47'. In this example, the lengths and the widths of output surfaces of the light sources 41' to 43' are equal to the lengths and the widths of respective input surfaces of the color cube 44' (for example the dimensions of an output surface 51' of the first light source 41' is equal to that of an input surface 52' of the color cube 44'). However, the dimensions of the output surfaces of the light sources 41' to 43' may also be smaller than those of respective input surfaces of the color cube 44'.

Figure 21:
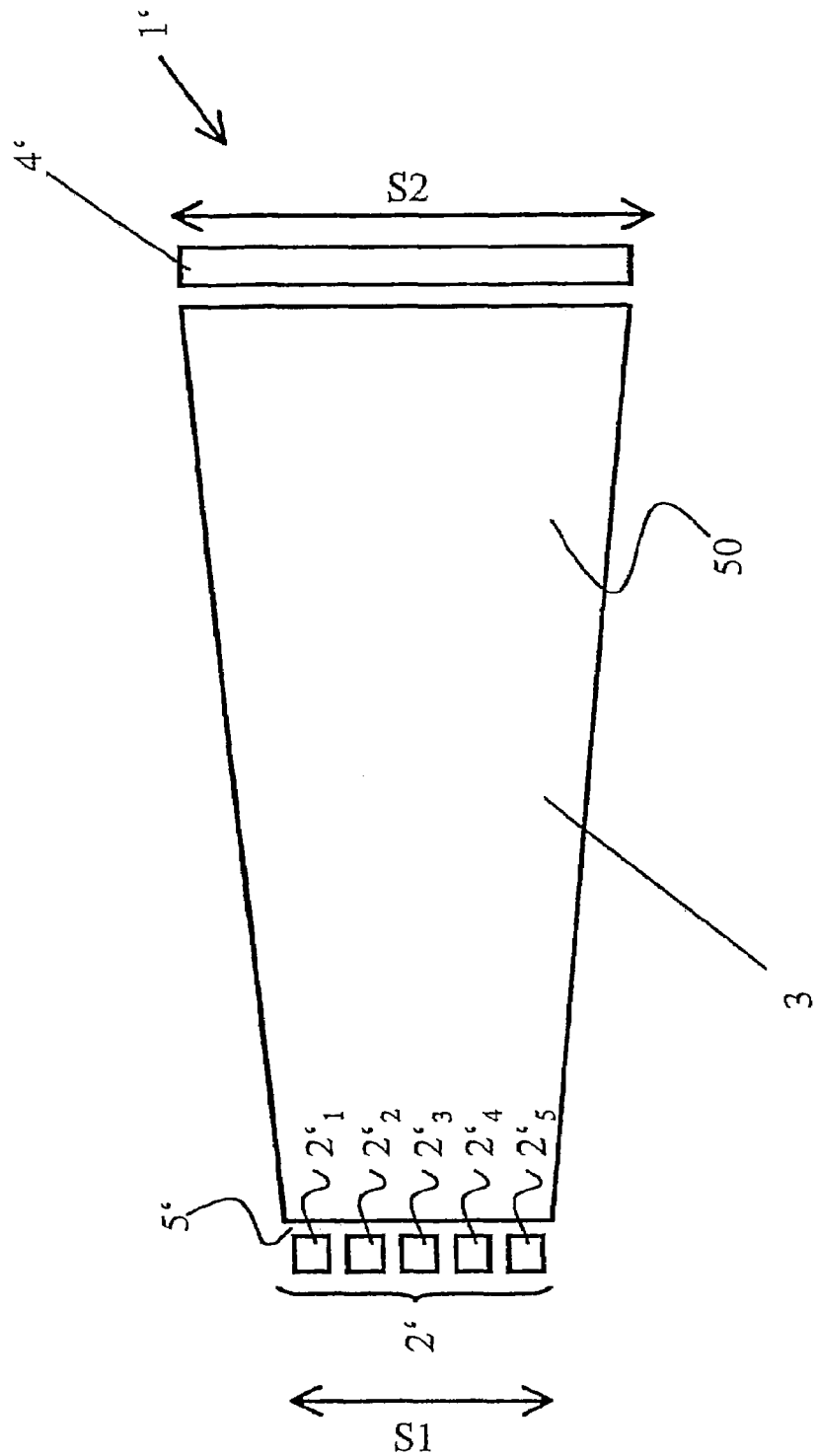
FIG. 21 shows a known illumination arrangement.

Compared to the embodiment shown in FIG. 21, the brightness of the color illumination of the surface 48' is remarkably higher since an overall output surface of the light sources 41' to 43' which emits light is three times higher than that in FIG. 21. The pyramidal light pipe is responsible for homogenization and collimation of the illumination.

Making reference to FIG. 14, a second embodiment of an illumination arrangement according to the present invention will be described. In this embodiment, the color cube 44' of FIG. 13 is replaced by a combination of dichroic filters. An illumination arrangement 60' comprises a first to third light source 61' to 63', a first dichroic filter 64', a second dichroic filter 65', a pyramidal light pipe 66', and a surface 67' to be illuminated. The first and the second dichroic filter 64', 65' are realized as glass cubes having a first and a second transmissive/reflective film 68' and 69'. The first film 68' combines light beams being generated from the second and third light source 62', 63' into a combined light beam which enters the second dichroic filter 65' via an input surface 70'. The second dichroic filter 65' combines said combined light beam and a light beam being emitted from the first light source 61' by means of the second film 69' to generate a second combined light beam which enters the pyramidal light pipe 66'. The embodiment of FIG. 14 is less compact than that of FIG. 13. However, the illumination arrangement of FIG. 14 is easier to manufacture, in particular for very compact dimensions.

Figure 13:
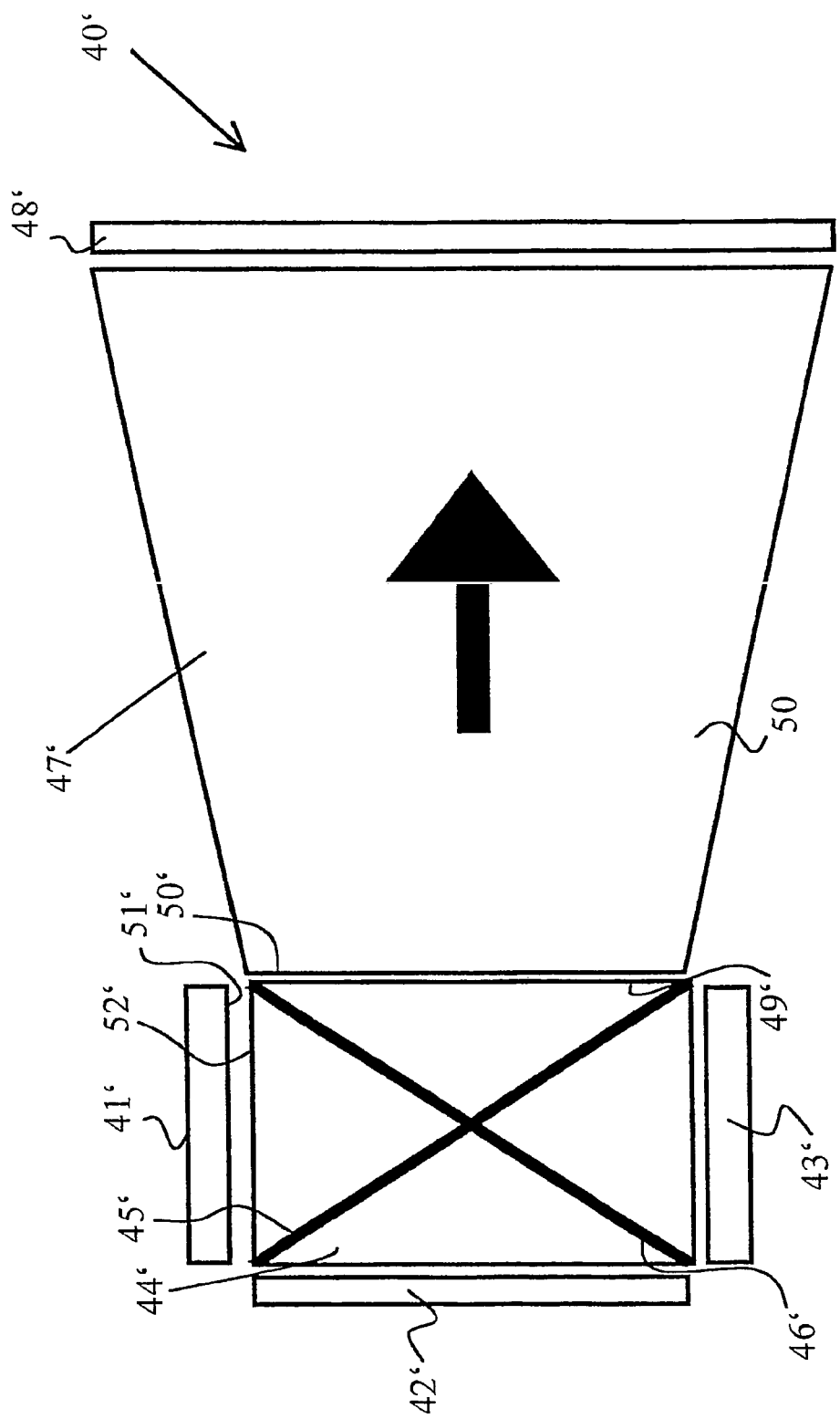
FIG. 13 shows a first embodiment of an illumination arrangement according to the present invention.
Figure 14:
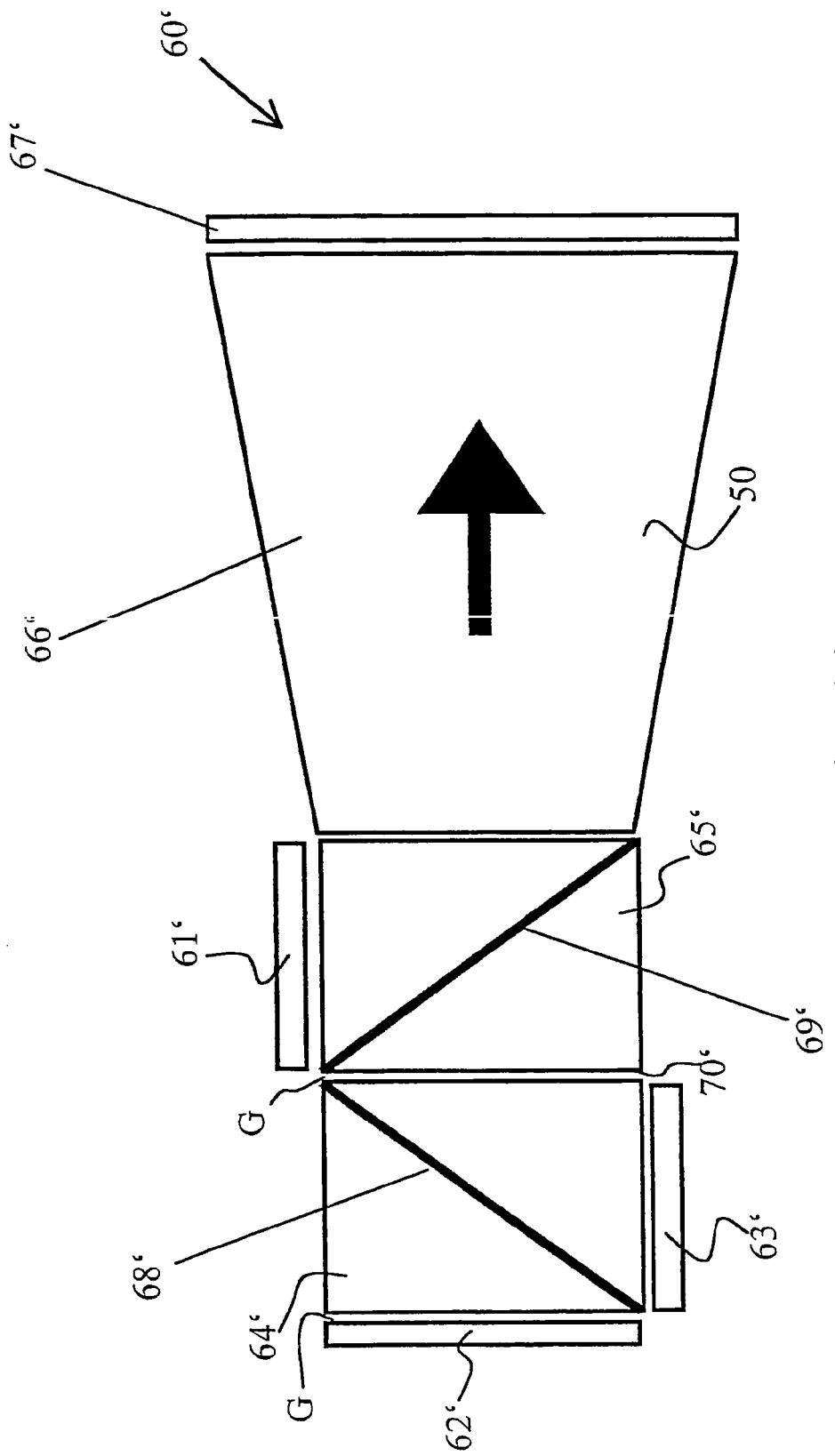
FIG. 14 shows a second embodiment of an illumination arrangement according to the present invention.

Preferably, in the embodiments of FIG. 13 and 14, air gaps G are provided between the light sources 41' to 43', 61' to 63', and the color cube 44'/dichroic filters 64', 65'. Preferably, air gaps are also provided between the color cube 44 and the pyramidal light pipe 47' as well as between the second dichroic filter 65' and the pyramidal light pipe 66' and between the first and the second dichroic filter 64', 65'. The reason for this is explained in FIGS. 17 and 18.

Figure 17:
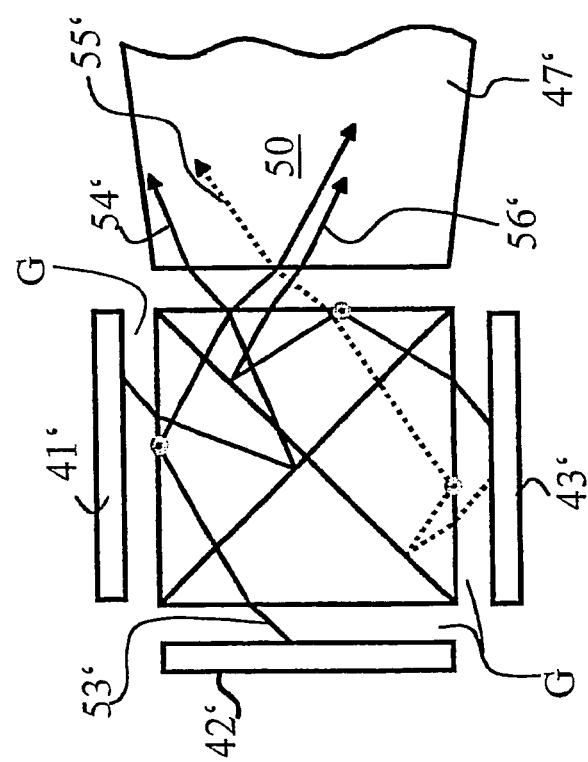
FIG. 17 shows an enlargement of the configuration of the light sources, the light mixing device and the light pipe of the embodiment shown in FIG. 13.

As can be taken from FIG. 17, a first to fourth light ray 53' to 56' is generated by the light sources 41' to 43'. Due to the air gaps G, all light rays 53' to 56' are reflected by total internal reflection (TIR) by the air gaps G and are thus coupled into the pyramidal light pipe 47'. Without such an air gap, only one of those light rays 53' to 56' would have been coupled into the pyramidal light pipe 47, namely light ray 54', as can be taken from FIG. 18. All other light rays are either absorbed by the light sources 41' to 43' or lost. That is, without air gaps G, the rays would either be absorbed or propagate in undesired directions producing optical losses. Some of the light rays (ray 54' in FIG. 18) are practically unaffected by the air gaps G. Optical losses is also the reason to employ glass cubes in FIG. 14 and not only glass plates 10', 11' as shown in FIG. 22. Such coated glass plates would let light rays escape in undesired directions producing optical losses.

Making reference to FIG. 15, a third embodiment of an illumination arrangement according to the present invention will be described. An illumination arrangement 80' comprises a first to third light source 81' to 83', a color cube 84' showing a first transmissive/reflective film 89' and a second transmissive/reflective film 90', a first to third pyramidal light pipe 85' to 87' and a target surface 88' to be illuminated. Preferably, in this embodiment, the light pipes 85' to 87' and the respective light sources 81' to 83' are in direct mechanical contact with each other. This embodiment is easy to manufacture since the dimensions of the color cube 84' are relatively large. To give an example: The cube edge has a typical size of 2.0 mm to 4.00 mm in the configurations of FIGS. 13 and 14, whereas the color cube has the dimensions of the μ-display (e.g. 0.7" diagonal) in the configuration of FIG. 3. However, the present invention is not restricted to these dimensions. Air gaps G are provided between the light pipes 85' to 87' and the color cube 84'. Light beams being emitted by the light sources 81' to 83' is transported by the light pipes 85' to 87' to the color cube 84', respectively, which mixes the light beams by means of the films 89', 90' to generate a combined light beam which illuminates the target surface 88'.

Making reference to FIG. 16, a fourth preferred embodiment of an illumination arrangement according to the present invention will be described. An illumination arrangement 100' comprises a first to third light source 101' to 103', a color cube 104' showing a first transmissive/reflective film 105' and a second transmissive/reflective film 106', a pyramidal light pipe 107', a target surface 108' to be illuminated, and a first to third additional pyramidal light pipe 109' to 111'. This embodiment differs from that shown in FIG. 13 only by the additional pyramidal light pipes 109' to 111'. Preferably, in this embodiment, the additional pyramidal light pipes 109' to 111' and the respective light sources 101' to 103' are in direct mechanical contact with each other.

Figure 15:
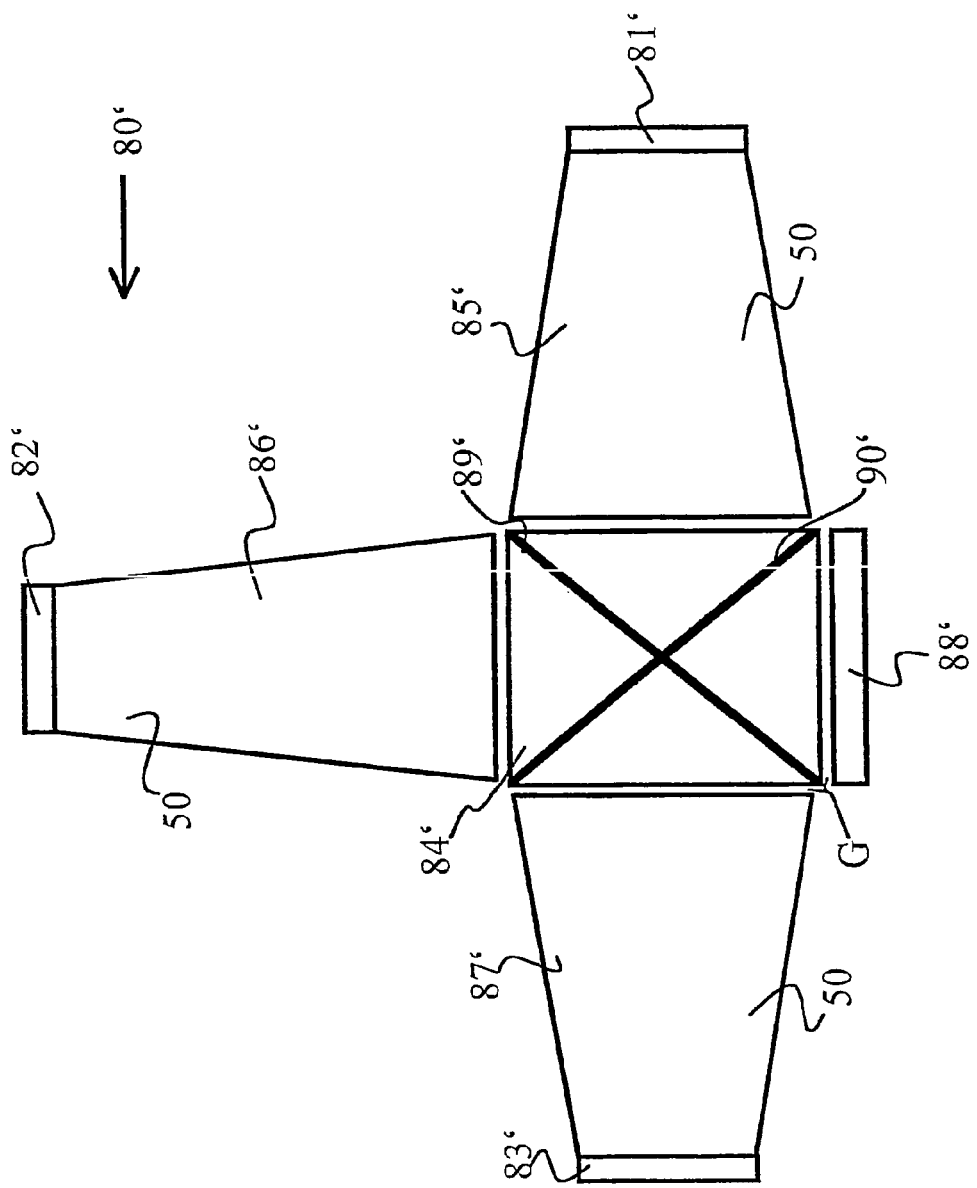
FIG. 15 shows a third embodiment of an illumination arrangement according to the present invention.
Figure 16:
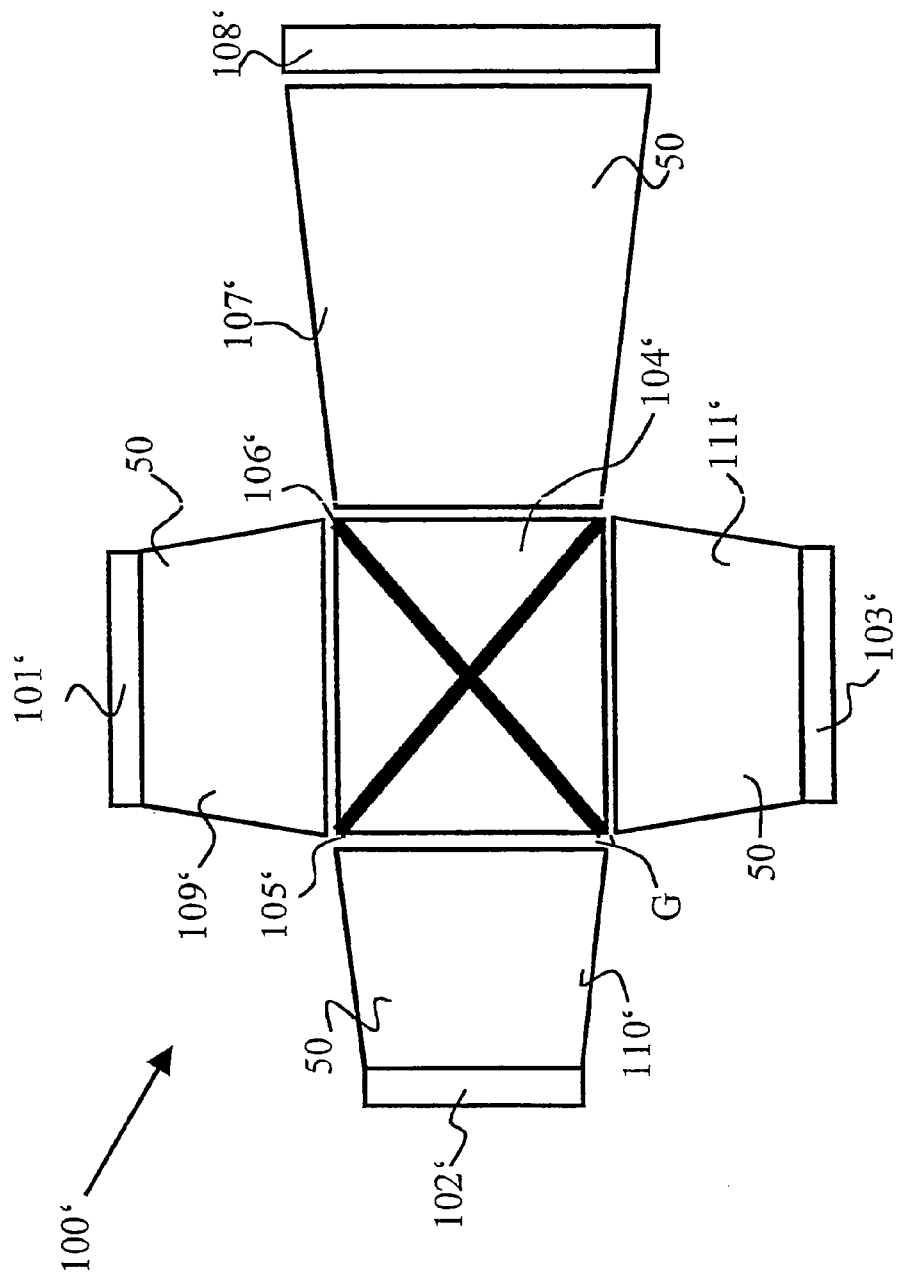
FIG. 16 shows a fourth embodiment of an illumination arrangement according to the present invention.
Figure 18:
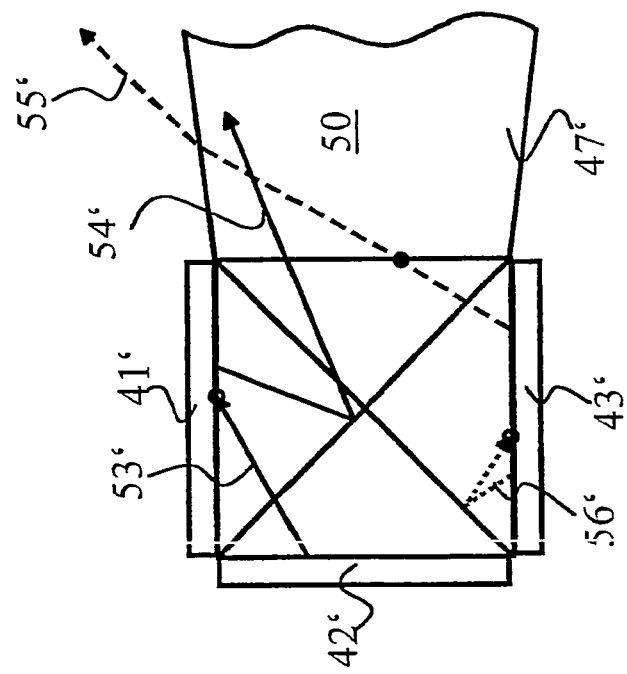
FIG. 18 shows an alternative configuration of the light sources, the light mixing device and the light pipe of the embodiment shown in FIG. 13.

The embodiment shown in FIG. 16 is more compact than that of FIG. 15. It is not as compact as that of FIG. 13, but easier to manufacture. Air gaps G are provided between the light pipes 109' to 111' and the color cube 104' and between the color cube 104' and the pyramidal light pipe 107'.

The color cube 44' and the dichroic filters 64', 65' are surrounded by air gaps G in order to minimize optical losses, as already explained. However, when the source is directly in front of the light pipe, as shown in FIGS. 15 and 16, there is no need to include an air gap between the source and the light pipe. This will be explained while making reference to FIGS. 19 and 20.

Figure 20:
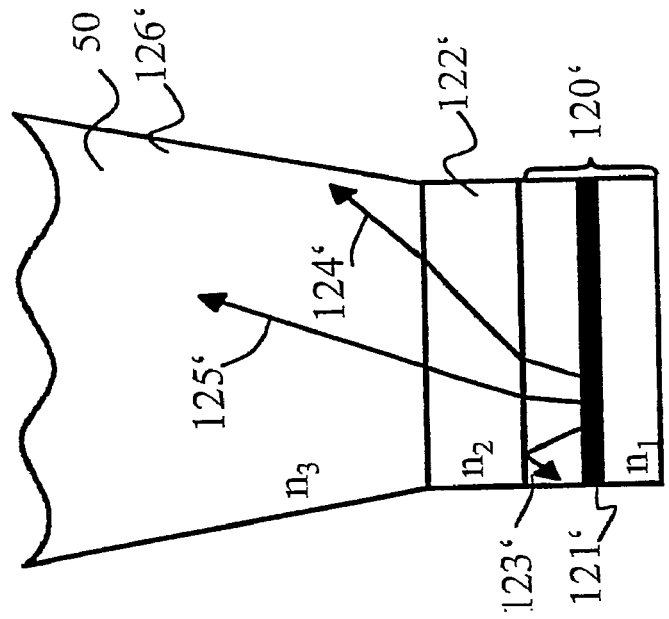
FIG. 20 shows an enlargement of an alternative configuration of a light source and a corresponding light pipe used in the embodiments of FIGS. 15 and 16.

Actually, when using surface mounted LEDs, the light extraction efficiency of the light source is increased when the light pipe is in contact with the LED surface (see FIG. 20). This results in an significant increase of the overall optical efficiency.

Figure 19:
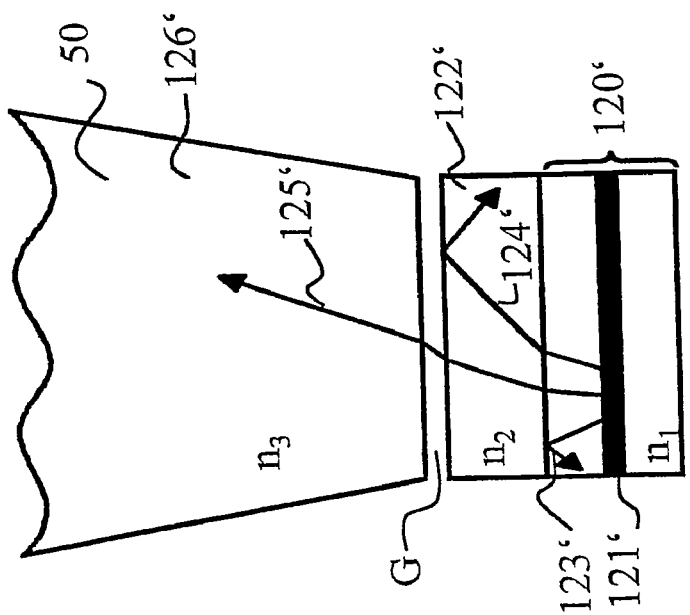
FIG. 19 shows an enlargement of a configuration of light source and light pipe used in the embodiments of FIGS. 15 and 16.

In FIGS. 19 and 20, a semiconductor active surface 121' of a semiconductor 120' is shown which emits light rays in random directions. Due to the high refractive index n1 of the semiconductor 120' compared to the refractive index n2 of an epoxy layer 122', part of the rays are trapped by total internal reflection (for example ray denoted by reference symbol 123'). In the configuration of FIG. 19, the same happens for parts of the rays between the epoxy layer 122' and an air gap G (see totally reflected ray denoted by reference symbol 124'). However, in the configuration shown in FIG. 20, where the epoxy layer 122' is in contact with a light pipe 126', all the rays leaving the epoxy layer 122' are coupled into the light pipe 126', as the refractive index of the epoxy layer 122', n2 and the refractive index of the light pipe 126', n3 preferably acre chosen close to each other (close to index matching condition).

Figure 26:
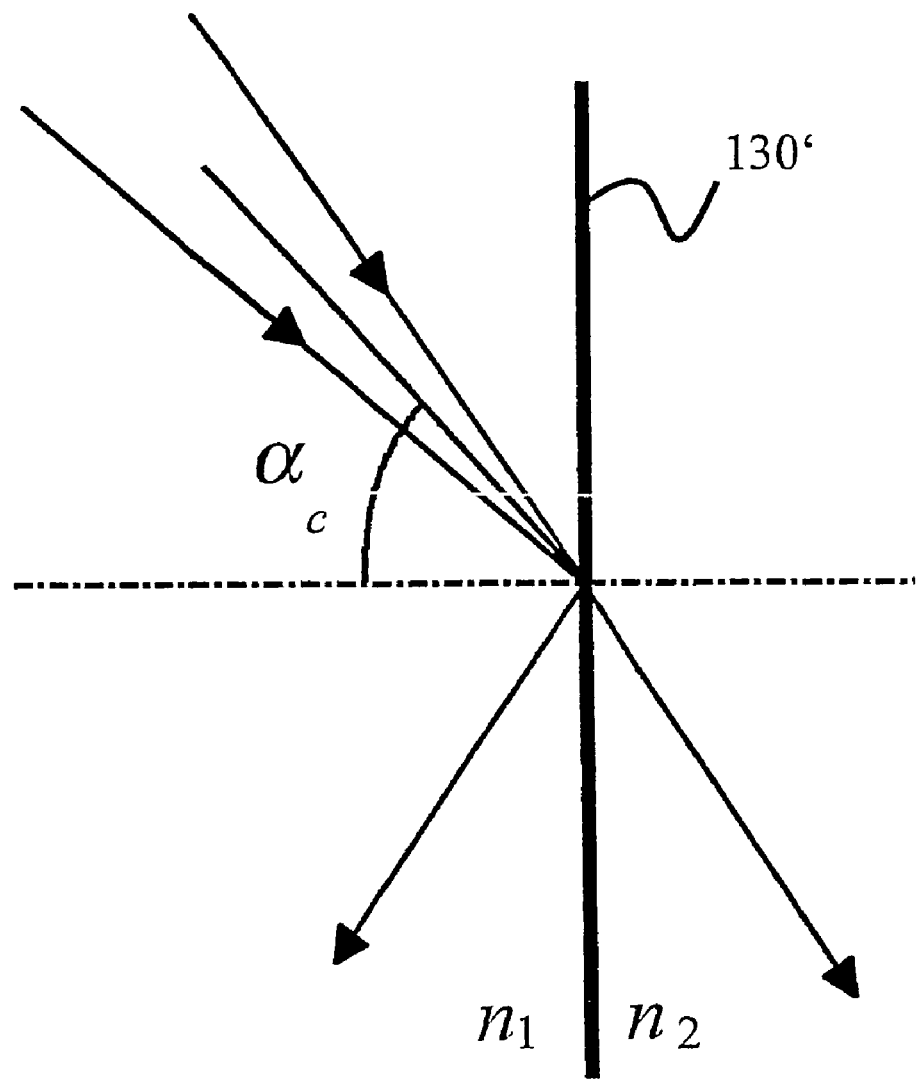
FIG. 26 shows the principle of total internal reflection.

The principle of total internal reflection is shown in FIG. 26. For a ray in a high refractive index medium n1 reaching an interface 130' with a lower refractive index medium n2, if the angle of incidence α is bigger than the critical angle αc, then the ray is totally internal reflected (TIR). Otherwise, the ray is refracted and propagates in the low refractive index medium. The critical angle is $\alpha_c = \sin^{-1}(n2/n1)$.

When using color or dichroic cubes for the illumination configurations proposed above, the full dichroic surface of the prisms/glass plates etc. is "used" (illuminated) by the light beams. In other words, the full surface should be coated by the corresponding dichroic films. In practice, however, it may be difficult to coat the surface close to the edges for several reasons (for example because the edges are already covered with undesired material).

Figure 27:
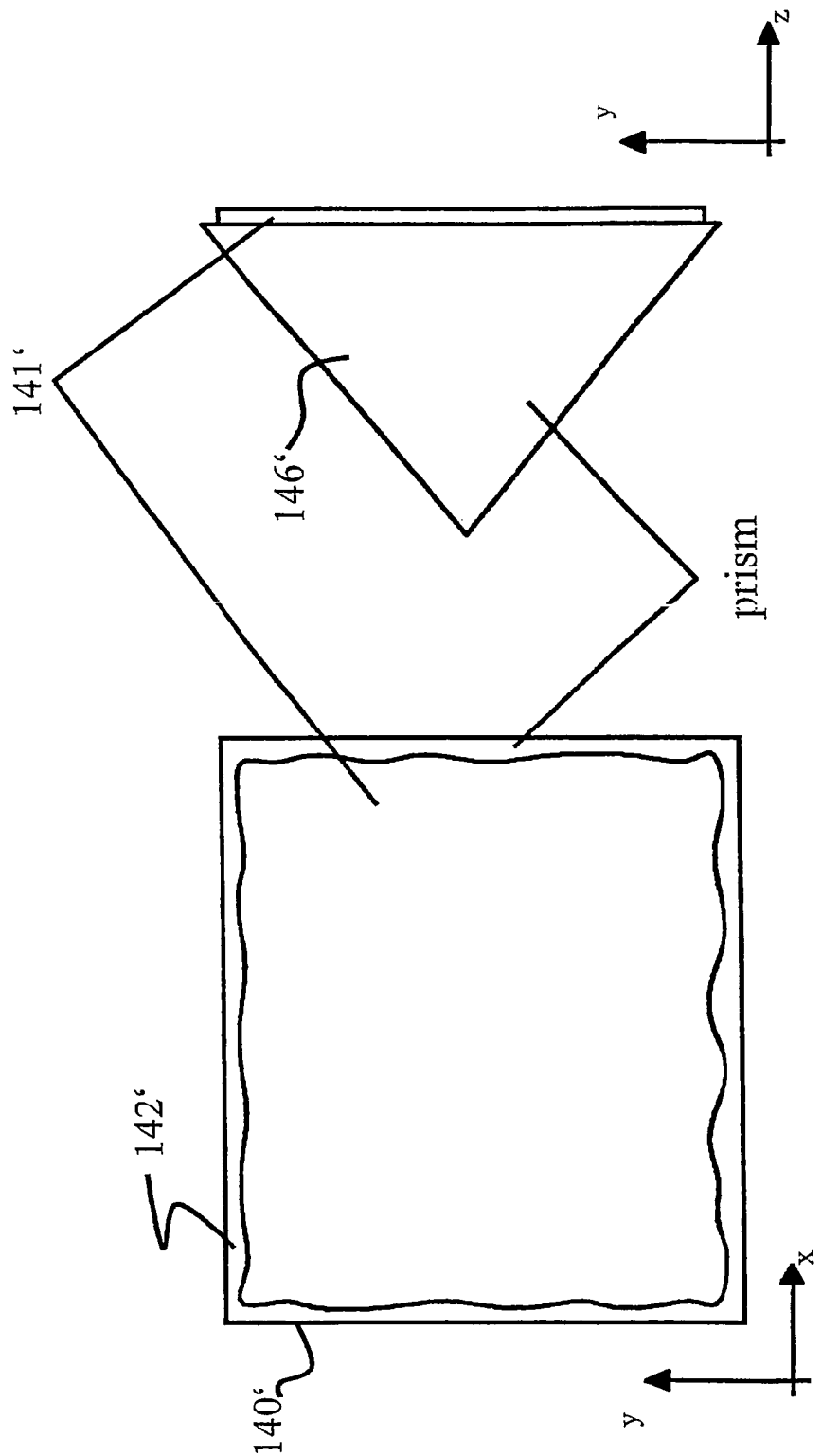
FIG. 27 illustrates a method for coating prisms.

This situation is shown in FIG. 27: A prism surface 140' is coated by a transmissive/reflective (dichroic) film 141' as described above. Usually, an uncoated margin 142' is left because of restrictions in the manufacturing process. When the prism size is small, the uncoated margin represents a significant proportion of the prism surface 140'. This results in optical losses as the color rays are not correctly redirected when falling on the uncoated margin 142'.

A way to turn around the uncoated margin problem is shown in FIG. 28. A thin glass plate 145' whose surface dimensions are bigger than the surface dimensions of a prism cross-section of two prisms 146', 147' is coated with said transmissive/reflective film 141' and then provided (glued) between the two prisms 146', 147' to get a dichroic filter on a glass prism basis. The uncoated margin 142' does then not lie within the prisms cross-section, thus the efficiency of the dichroic filter is optimized.

The following description is directed to preferred embodiments of the present invention, in particular with respect to said fourth solution by taking reference to FIGS. 29A to 32B.

FIGS. 29A and 29B demonstrate by means of cross-sectional side views embodiments of the present invention with and without the inventive light collecting and/or guiding improving arrangement 50A, respectively.

For collecting and integrating primary illumination light L1 from a light source device 10 a light integrating device 50 in the form of a pyramidal light pipe or integration rod 50 is provided, the latter having the light incidence aperture 50I and side walls 50s. The integration rod 50 uses the principle of total internal reflections or TIR as is demonstrated by the collected ray C which exits the light source device 10 and its housing 30c through a light exit aperture 30E so as to enter the light integrating device 50 or integration rod 50 through its light incidence aperture 50I. This happens under an angle which is sufficient so as to satisfy the TIR conditions for said collected ray C.

However ray R of FIG. 29A exits the light source device 10 through its light exit aperture 30E under an angle such that the TIR conditions cannot be fulfilled by said ray R. Therefore said ray R is not reflected back to the internal at the side wall 50s of said light integration device 50 but escapes from the light integration device 50. Therefore according to the situation of FIG. 29A light may be lost thereby decreasing the efficiency of the arrangement of FIG. 29A.

According to a further aspect of the present invention the arrangement of FIG. 29A is modified by providing at the periphery of the side walls 50s of the light integration device 50 in the neighborhood of said light incidence aperture 50I reflecting means 50m as said light collecting and/or guiding improving arrangement 50A or as a part thereof. According to this particular measure said ray R which is lost in the arrangement of FIG. 29A is reflected back by said reflecting means 50m of said light collecting and/or guiding improving arrangement 50A. Thereby, the efficiency or light efficiency of the arrangement shown in FIG. 29B is improved when compared to the arrangement of FIG. 29A.

Figure 30B:
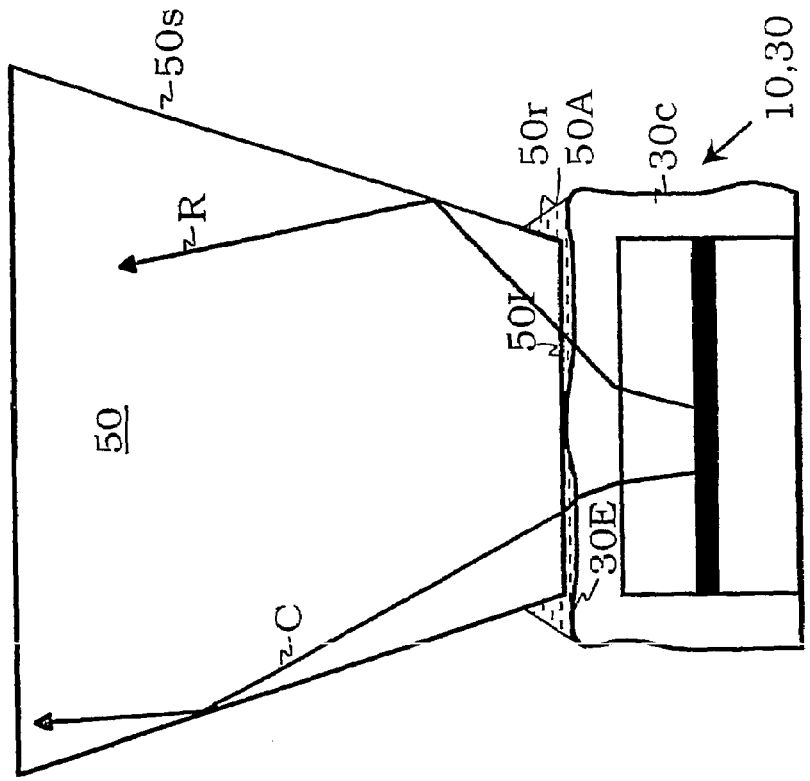
FIG. 30A, 30B are cross-sectional side views of embodiments of the present invention without and with a respective light collecting and/or guiding improving arrangement, respectively.
Figure 30A:
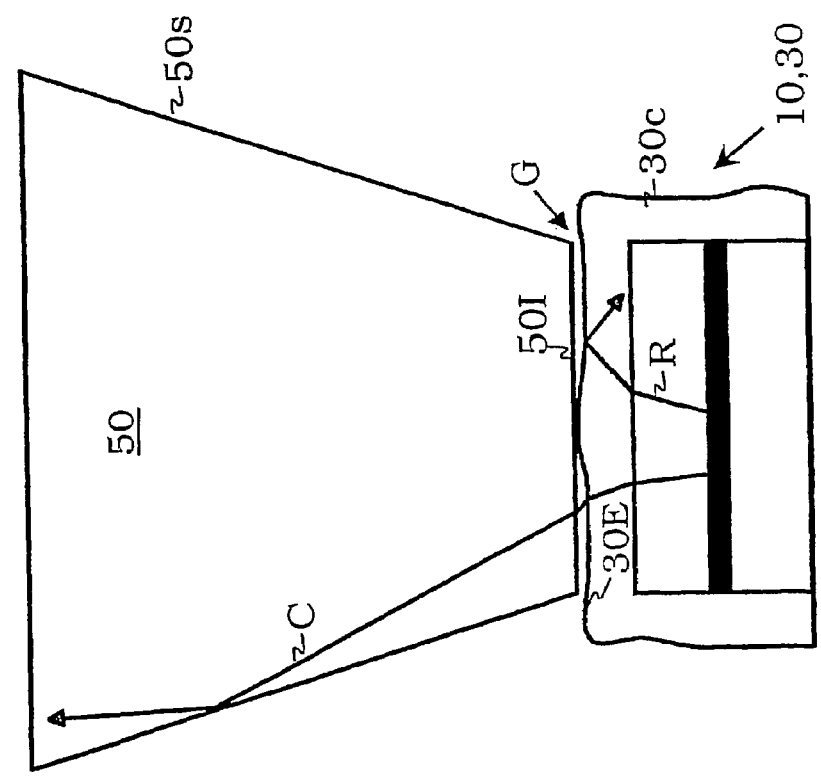

FIGS. 30A and 30B also describe illumination arrangements according to the present invention without and with the provision of the inventive light collecting and/or guiding improving arrangement 50a, respectively.

In the arrangement of FIG. 30A an air gap or air gap structure G is situated between the light exit aperture 30E of the light source device 10 and the light incidence aperture 50I of the light integrating device 50 in the form of an pyramidal integration rod 50. Produced ray C of light enters the internal of the light integrating device 50 after being transmitted by said air gap G under angle conditions which fulfill the TIR conditions of the light integrating device 50. Therefore ray C remains collected in the internal of said light integration device 50. However ray R shown in FIG. 30A gets lost by being reflected at the interface between the casing 30c of the light source 10 and the air gap G according to total internal reflection. This TIR condition at the interface between the casing 30c and the air gap G strongly depends on the large difference between the refraction indices of the material of the casing 30c or of the light source device material and the air gap.

To overcome this difficulty in the embodiment of FIG. 30b the air gap G between the light exit aperture 30E of the light source device 10 and the light incidence aperture 50I of the light integrating device 50 is filled with a liquid, gel, and/or a glue or a refraction index matching means 50r as said light collecting and/or guiding improving arrangement 50A or as a part thereof. Thereby, the light efficiency of the embodiment of FIG. 30B is improved when compared to the light efficiency of the embodiment of FIG. 30A, as for instance ray R is coupled to the integration rod 50.

FIGS. 31A and 31B demonstrate by means of cross-sectional side views embodiments of the inventive illumination arrangements without and with the provision of the inventive light collecting and/or guiding improving arrangement.

In both cases the illumination arrangement comprises as a light integration device 50 a hollow pipe or hollow guide tube in pyramidal form. This light integration device 50 comprises a light incidence aperture 50i which is positioned in the neighborhood of a light exit aperture 30E of said light source device 10. In a similar way as compared to the embodiment of FIG. 30A a ray C may be collected by said guide tube, whereas the ray R suffers from total internal reflection at the interface between the light source devices' material and the air. Therefore a fraction of the light or primary illumination light L1 being emitted from said light source device 10 via its light exit aperture 30E gets lost.

To overcome this problem a plain light pipe section 50p as said light collecting and/or guiding improving arrangement 50A or as a part thereof is provided filling an end section of the hollow guide tube or hollow pipe as said integration device 50. Additionally, said, plain pipe section 50p completely fills the end section of the hollow pipe as said light integration device 50 and terminates the same and its light incidence aperture 50I. Between the end surface or light incidence aperture 50I and said light exit aperture 50E again a refraction index matching means 50r is provided so as to overcome the TIR problems at the interface between the light exit aperture 30E of the light source device 10 and the air gap G. Thereby less primary illumination light L1 is lost and additionally the light efficiency of the arrangement shown in FIG. 31B is improved over the light efficiency of the embodiment shown in FIG. 31A.

| Reference Symbols | |
|---|---|
| 1 | Illumination arrangement |
| 10 | light source device |
| 20 | light collecting, integrating and redirecting device |
| 30 | solid state light source device |
| 30c | case/case material, housing/housing material |
| 30E | light exit aperture, light output aperture |
| 30I | light incidence aperture, light entrance aperture |
| 30O | light exit aperture, light output aperture |
| 31 | solid state light source, LED |
| 31-1 | solid state light source, LED |
| 31-2 | solid state light source, LED |
| 31-3 | solid state light source, LED |
| 31-4 | solid state light source, LED |
| 32 | solid state light source |
| 33 | array of solid state light sources |
| 40 | light valve device, LCD panel |
| 40E | light exit aperture, light output aperture |
| 40I | light incidence aperture, light entrance aperture |
| 40O | light exit aperture, light output aperture |
| 50 | light integrating device, integrator rod, light pipe |
| 50A | light coupling and/or guiding improving arrangement |
| 50E | light exit aperture, light output aperture |
| 50E' | light exit aperture, light output aperture |
| 50I | light incidence aperture, light entrance aperture |
| 50I' | light incidence aperture, light entrance aperture |
| 50m | reflecting means, reflecting mirror |
| 50O | light exit aperture, light output aperture |

-continued

| Reference Symbols | |
|---|---|
| 50p | plain light pipe section, plain pipe section |
| 50r | refraction index matching means, liquid, gel, glue |
| 50s | side wall |
| 50-1 | light integrating device, integrator rod, light pipe |
| 50-2 | light integrating device, integrator rod, light pipe |
| 50-3 | light integrating device, integrator rod, light pipe |
| 50-4 | light integrating device, integrator rod, light pipe |
| 55 | light mixing device, beam splitter device, colour cube device |
| 60 | display optics |
| 70 | projection optics |
| 80 | display, display screen |
| 81 | intermediate optics, lens arrangement |
| 82 | intermediate optics, polarization beam splitter |
| 1' | illumination arrangement |
| 2' | light source array |
| $2'_1$ | first light source |
| $2'_2$ | second light source |
| $2'_3$ | third light source |
| $2'_4$ | fourth light source |
| $2'_5$ | fifth light source |
| 3' | pyramidal light pipe |
| 4' | target surface |
| 10' | first dichroic filter |
| 11' | second dichroic filter |
| 12' | first colour beam |
| 13' | second colour beam |
| 14' | third colour beam |
| 15' | combined colour beam |
| 16' | transmissive/reflective film |
| 17' | transmissive/reflective film |
| 20' | first prism |
| 21' | second prism |
| 22' | third prism |
| 23' | first reflective/transmissive film |
| 24' | second reflective/transmissive film |
| 25' | first prism |
| 26' | second prism |
| 27' | third prism |
| 28' | first reflective/transmissive film |
| 29' | second reflective/transmissive film |
| 31' | first prism |
| 32' | second prism |
| 33' | third prism |
| 34' | fourth prism |
| 35' | first transmissive/relflective film |
| 36' | second transmissive/reflective film |
| 40' | illumination arrangement |
| 41' | first light source |
| 42' | second light source |
| 43' | third light source |
| 44' | colour cube |
| 45' | first transmissive/reflective film |
| 46' | second transmissive/reflective film |
| 47' | pyramidal light pipe |
| 48' | target surface |
| 49' | output surface |
| 50' | input surface |
| 51' | output surface |
| 52' | input surface |
| 53' | first light ray |
| 54' | second light ray |
| 55' | third light ray |
| 56' | fourth light ray |
| 60' | illumination arrangement |
| 61' | first light source |
| 62' | second light source |
| 63' | third light source |
| 64' | first dichroic filter |
| 65' | second dichroic filter |
| 66' | pyramidal light pipe |
| 67' | target surface |
| 68' | first transmissive /reflective film |
| 69' | second transmissive/reflective film |
| 70' | input surface |
| 80' | illumination arrangement |

Reference Symbols

| | |
|---|---|
| 81' | first light source |
| 82' | second light source |
| 83' | third light source |
| 84' | colour cube |
| 85' | first pyramidal light pipe |
| 86' | second pyramidal light pipe |
| 87' | third pyramidal light pipe |
| 88' | target surface |
| 89' | first transmissive/reflective film |
| 90' | second transmissive/reflective film |
| 100' | illumination arrangement |
| 101' | first light source |
| 102' | second light source |
| 103' | third light source |
| 104' | colour cube |
| 105' | first transmissive/reflective film |
| 106' | second transmissive/reflective film |
| 107' | pyramidal light pipe |
| 108' | target surface |
| 109' | pyramidal light pipe |
| 110' | pyramidal light pipe |
| 111' | pyramidal light pipe |
| 120' | semiconductor |
| 121' | semiconductor active surface |
| 122' | epoxy layer |
| 123' | TIR ray |
| 124' | TIR ray |
| 126' | light pipe |
| 130' | interface |
| 140' | prism surface |
| 141' | first transmissive/reflective (dichroic) film |
| 142' | uncoated margin |
| 145' | glass plate |
| 146' | prism |
| 147' | prism |
| G | gap structure |
| G' | gap structure |
| L1 | primary illumination light |
| L2 | secondary illumination light |
| n1 | refraction index |
| n2 | refraction index |
| n3 | refraction index |
| RL1 | redirected primary illumination light |

The invention claimed is:

1. An illumination arrangement, comprising:
   a solid state light source; and
   a light collecting, integrating and re-directing device configured to receive at least a part of emitted light from said solid state light source and to re-direct said received light, said light collecting, integrating and re-directing device includes a hollow light pipe with a light incidence aperture, which is positioned in close proximity of a light exit aperture of said solid state light source, and an end section of said hollow light pipe in close proximity of said light incidence aperture is filled with a plain light pipe.

2. The illumination arrangement according to claim 1, wherein between said light incidence aperture of said light collecting, integrating and re-directing device and said light exit aperture of said solid state light source refraction index matching means are provided filing a gap or a gap structure between said light incidence aperture of said light collecting, integrating and re-directing device and said light exit aperture of said light source device.

3. The illumination arrangement according to claim 2, wherein said refraction index matching means is a liquid, gel, and/or a glue.

4. A method for manufacturing an illumination arrangement comprising:
   positioning a hollow light pipe on top/around a solid state light source;
   depositing a droplet of index matching glue on the solid state light source;
   inserting a plain light pipe into the hollow light pipe;
   pressing the plain light pipe against the solid state light source; and
   curing the glue.

5. The method according to claim 4, further comprising:
   fine tuning a horizontal alignment of the light pipes and the solid state light source before curing the glue.

* * * * *